(12) United States Patent
Van Buijtene

(10) Patent No.: US 12,371,258 B2
(45) Date of Patent: *Jul. 29, 2025

(54) STORAGE SYSTEM AND A METHOD OF OPERATING THE STORAGE SYSTEM

(71) Applicant: O.W. MACHINEBOUW B.V., Pijnacker (NL)

(72) Inventor: Oscar Van Buijtene, The Hague (NL)

(73) Assignee: O.W. MACHINEBOUW B.V., Pijnacker (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,394

(22) Filed: Feb. 27, 2024

(65) Prior Publication Data

US 2024/0199329 A1 Jun. 20, 2024

Related U.S. Application Data

(63) Continuation of application No. 17/258,985, filed as application No. PCT/EP2018/068845 on Jul. 11, 2018, now Pat. No. 11,981,506.

(51) Int. Cl.
*B65G 1/04* (2006.01)
*F16G 13/20* (2006.01)

(52) U.S. Cl.
CPC ......... *B65G 1/0492* (2013.01); *B65G 1/0464* (2013.01); *B65G 1/0471* (2013.01); *F16G 13/20* (2013.01)

(58) Field of Classification Search
CPC .. B65G 1/0492; B65G 1/0464; B65G 1/0471; F16G 13/20
See application file for complete search history.

(56) References Cited

U.S. PATENT DOCUMENTS

| 3,964,619 A | 6/1976 | Irmler | |
|---|---|---|---|
| 4,088,232 A * | 5/1978 | Lilly | B65G 1/0464 |
| | | | 414/282 |

(Continued)

FOREIGN PATENT DOCUMENTS

| DE | 202004006624 U1 | 9/2005 |
|---|---|---|
| EP | 3053855 A2 | 8/2016 |

(Continued)

OTHER PUBLICATIONS

International Search Report and Written Opinion for corresponding International Application No. PCT/EP2019/068761; dated Nov. 19, 2019 (23 pages).

*Primary Examiner* — Saul Rodriguez
*Assistant Examiner* — Ashley K Romano
(74) *Attorney, Agent, or Firm* — Mendelsohn Dunleavy, P.C.; Kevin J. Dunleavy

(57) ABSTRACT

A storage system (1) comprises a plurality of vertical stacks (2) of storage containers (3), wherein the stacks (2) are arranged in a horizontal first direction (X) and a horizontal second direction (Y) which is perpendicular to the first direction (X), a transport unit (8) for transporting at least one container (3) to or from a selected stack (2) in the first and/or second direction (X, Y), and a container handling device (9, 10) for transferring at least an upper container (3) from a selected stack (2) to the transport unit (8) before the transport unit (8) including the container (3) is transported from the selected stack (2) and for transferring at least a container (3) from the transport unit (8) to the top of a selected stack (2) after the transport unit (8) including the container (3) is transported to the selected stack (2). The transport unit (8) is movable above the stacks (2). The container handling device comprises a lifting member (9) for displacing a selected stack (2) in vertical direction with respect to adjacent stacks (2), wherein the lifting member (9) is movable below the (Continued)

stacks (2) in a non-lifting condition thereof, and the container handling device comprises an engaging member (10) that is provided at the transport unit (8) and suitable for engaging at least an upper container (3) of a lifted stack so as to retrieve the container or for releasing an engaged container so as to place the container on top of a selected stack.

19 Claims, 23 Drawing Sheets

(56) References Cited

U.S. PATENT DOCUMENTS

| | | | |
|---|---|---|---|
| 4,470,742 A * | 9/1984 | Schindler | B65G 1/0478 |
| | | | 104/162 |
| 9,897,180 B2 | 2/2018 | Hartinger et al. | |
| 10,947,042 B2 | 3/2021 | Hognaland | |
| 10,961,051 B1 | 3/2021 | Lindbo et al. | |
| 11,084,655 B2 | 8/2021 | Van Staalduinen | |
| 11,208,265 B2 | 12/2021 | Fjeldheim et al. | |
| 11,312,575 B2 | 4/2022 | Austrheim | |
| 11,492,203 B2 | 11/2022 | Clark et al. | |
| 2015/0098775 A1 * | 4/2015 | Razumov | B66F 11/04 |
| | | | 414/807 |
| 2015/0127143 A1 | 5/2015 | Lindbo et al. | |
| 2016/0272421 A1 | 9/2016 | Hognaland | |
| 2018/0237221 A1 * | 8/2018 | Lindbo | E04B 2/7403 |

FOREIGN PATENT DOCUMENTS

| | | |
|---|---|---|
| EP | 3099604 A1 | 12/2016 |
| JP | H05201544 A | 8/1993 |
| JP | 2016160964 A | 9/2016 |
| WO | 2010100513 A2 | 9/2010 |
| WO | 2015019055 A1 | 2/2015 |
| WO | 2017064401 A1 | 4/2017 |

* cited by examiner

STORAGE SYSTEM AND A METHOD OF OPERATING THE STORAGE SYSTEM

CROSS-REFERENCE TO RELATED APPLICATIONS

This application is a continuation of U.S. patent application No. 17/258,985, filed on Jan. 8, 2021, currently pending, which, in turn, is a 371 continuation of PCT/EP2019/068761, filed on Jul. 11, 2019, now expired, which, in turn, claims priority to PCT application no. PCT/EP2018/068845, filed on Jul. 11, 2018, now expired, the disclosures of which are hereby incorporated by reference in their entirety as if set forth fully herein.

FIELD OF THE INVENTION

The present invention relates to a storage system, comprising a plurality of vertical stacks of storage containers, wherein the stacks are arranged in a horizontal first direction and a horizontal second direction which is perpendicular to the first direction, a transport unit for transporting at least one container to or from a selected stack in the first and/or second direction, a container handling device for transferring at least an upper container from a selected stack to the transport unit before the transport unit including the container is transported from the selected stack and for transferring at least a container from the transport unit to the top of a selected stack after the transport unit including the container is transported to the selected stack, wherein the transport unit is movable above the stacks.

BACKGROUND OF THE INVENTION

Such a storage system is known from US 2015/0127143. The known storage system comprises a frame which contains a plurality of stacks of containers and vehicles for retrieving a single container and a plurality of containers from a selected stack. The vehicle runs on rails in a grid pattern across the top of the stacks. The storage system is provided with a controller which tracks each container, so that the appropriate container(s) can be retrieved, transported and replaced as desired.

An object of the invention is to provide a storage system including a simple container handling device.

BRIEF SUMMARY OF THE INVENTION

This object is accomplished with the storage system according to the invention, which is characterized in that the container handling device comprises a lifting member for displacing a selected stack in vertical direction with respect to adjacent stacks, wherein the lifting member is movable below the stacks in a non-lifting condition thereof, and wherein the container handling device comprises an engaging member that is provided at the transport unit and suitable for engaging at least an upper container of a lifted stack so as to retrieve the container or for releasing an engaged container so as to place the container on top of a selected stack.

Due to the presence of the lifting member the transport unit can engage a container by approaching it in a horizontal direction without requiring means for digging a container from a stack. For example, when a target container from a selected stack must be fetched by the transport unit, the stack can be lifted by the lifting member such that the containers above the target container are located above a top plane in which the upper sides of the stacks lie and can be taken by engaging the container which is located directly above the target container, after which the containers can be transported to a temporary storage location. Subsequently, the lifting member can lift the selected stack further such that the target container projects above the top plane. This provides the possibility for the engaging member of the transport unit to engage the target container and to transport it to a desired location. Hence, the lifting member and the engaging member of the transport unit together form the container handling device.

The storage containers may have a lot of different forms, such as boxes, crates, and the like.

In a preferred embodiment the stacks rest on a support, wherein the lifting member is suitable for displacing a selected stack in vertical direction with respect to the support, wherein the lifting member is movable below the support in the non-lifting condition thereof. Hence, the support bridges a space which allows movement of the lifting member below the stacks.

The lifting member may comprise a drivable push chain. An advantage of this embodiment is that the lifting member is flexible, on the one hand, but rigid in a lifting condition, on the other hand. This provides the opportunity to push a selected stack in vertical direction whereas storing the chain in horizontal direction below the stacks or the support. A typical push chain comprises a series of links. Each link is flexibly connected to its neighbouring link at their cross axes. However, the ends of the links are designed to interlock with the ends of the neighbouring links such that when a thrust or compressive force is applied to the chain in the linkwise direction, the links lock together so that the chain resists bending in one direction but is able to bend or coil in the other direction. Without applying a pushing force, the chain may act as an ordinary chain. The push chain may be driven by an electric motor.

The push chain may be bendable in two directions which are perpendicular to each other, which provides a great flexibility of storing the push chain in a non-lifting condition.

In a preferred embodiment the push chain follows a curved path in a horizontally oriented plane when all the stacks rest on the support. The curved path may be a helical path in order to minimize the footprint of the push chain in its non-lifting condition.

In an embodiment a portion of the push chain follows a helical path and a vertically oriented portion of the push chain extends within the helical path. A supporting element for supporting a stack of containers may be mounted on top of the vertically oriented portion. An advantage of this embodiment is that the lifting member is relatively compact.

The lifting member may be drivable in all horizontal directions rather than in the first and second direction only, whereas it may also be rotatable about a vertical axis.

In a particular embodiment the drivable push chain is mounted on a carriage and rotatable with respect to the carriage about a vertical axis of rotation, wherein the push chain is guided such that it follows a horizontal and a vertical path during lifting a stack, which vertical path is located at a distance from the axis of rotation.

The carriage may be guidable along a guide which is located below the stacks.

The guide may be linear such that the carriage is movable in a single direction. This provides the opportunity to use a plurality of such lifting members in the storage system.

The transport unit may have a container receiving portion including two arms for receiving a container between the arms, wherein the engaging member comprises at least two holders which are movably mounted to the respective arms and movable towards each other so as to engage a container between the arms.

In a particular embodiment the holder is part of a slider-crank linkage of which a connecting rod is formed by the holder and of which a slider is mounted to the corresponding arm and movable with respect to the arm in vertical direction, wherein a first portion of the holder is rotatably mounted to the slider and a second portion of the holder remote from its first portion is rotatably mounted to a first portion of a crank of the slider-crank linkage, wherein a second portion of the crank remote from its first portion is rotatably mounted to the corresponding arm. When moving the slider in vertical direction the second portion of the holder will be moved outwardly with respect to the corresponding arm of the transport unit. This appears to be a simple and effective mechanism of the engaging member. The holder may be shaped such that it can support a rim at an outer side of a container.

The storage system may be provided with an auxiliary transport unit for transporting a plurality of storage containers to or from a selected stack in the first and/or second direction, wherein the auxiliary transport unit is provided with an engaging member for engaging at least an upper container of a lifted stack so as to retrieve the container or for releasing an engaged container so as to place the container on top of a selected stack. In fact the auxiliary transport unit is basically similar as the transport unit, but in a practical embodiment it can accommodate a higher number of containers than the transport unit.

The storage system may be provided with a storage vehicle for temporarily storing at least a container at a selected stack, which storage vehicle is movable with respect to the stacks in the first and/or second direction and provided with engaging means for engaging at least a container, wherein the storage vehicle is adapted such that when the lifting member lifts the selected stack to a level at which at least two containers project above a top plane in which upper sides of the stacks lie, the engaging means can engage the second container above the top plane whereas the first container above the top plane is accessible by the transport unit. In this embodiment the engaging means of the storage vehicle can hold one or more containers above the target container which should be fetched by the transport unit such that the target container can be engaged by means of the engaging member of the transport unit. The storage vehicle may also comprise wheels which run on the upper rims of the upper containers, similar to the transport unit. It is noted that the storage vehicle can also be applied in a storage system in which it is not directly supported by upper containers of the stacks, but by a separate frame, for example. In the latter case the top plane may be formed by the frame.

The invention is also related to a method of operating the storage system wherein the location for the first container is clear or made clear by lifting the selected stack through the lifting member until the engaging means of the storage vehicle engages a predetermined container and subsequently lowering the lifting member so as to clear the location between the engaged container and the top plane, wherein the transport unit puts a replacement container at the clear location, after which the lifting member lifts or lowers the formed stack including the replacement container upon disengaging the engaged container in case of an engaged container until a target container from the stack forms the first container above the top plane so as to enable the transport unit to take away the target container. This appears to be an efficient method of operating the storage system.

The predetermined container may be adjacent to the target container in order to put the replacement container at the same location within the stack as where the container that is taken away by the transport unit comes from.

It is noted that the transport unit, the auxiliary transport unit, the lifting member and the storage vehicle may be provided with respective power sources in the form of rechargeable batteries.

It is also noted that the engaging member of the transport unit and the auxiliary transport unit and the engaging means of the storage vehicle may have a lifting function, in addition to the lifting member. For example, if the containers are nested the engaging members or engaging means may slightly raise a container in order to take it from a stack.

In a particular embodiment the transport unit is provided with a set of first wheels at opposite sides of the transport unit for travelling in the first direction and a set of second wheels at opposite sides of the transport unit for travelling in the second direction, wherein at least one of the sets is liftable with respect to the remainder of the transport unit so as to selectively run either the set of first wheels or the set of second wheels on top of the stacks or on rails in a grid pattern across the top of the stacks. For example, if the first set is liftable and the second set is stationary with respect to the remainder of the transport unit, the transport unit can move in the second direction if the first set is lifted and the transport unit can move in the first direction if the first set is in a non-lifted condition.

Respective shafts of the wheels of the at least one of the sets may be eccentrically and movably mounted to the remainder of the transport unit. This means that the shafts can be rotated about respective axes of rotation so as to lift the wheels with respect to the remainder of the transport unit.

The storage system may be provided with a climbing vehicle which is drivable along a vertical guide at a circumference of the stacks for transporting a container in vertical direction to and from the top of an adjacent stack.

The transport unit may transport a container to and from the location where the climbing vehicle arrives at the top of the stacks. The climbing vehicle may have its own control system to drive to and from the vertical guide and to climb along the guide. It is noted that the climbing vehicle is not necessarily related to the handling device according to the invention.

Another aspect of the invention is related to a push chain for use in a storage system as described hereinbefore. In more general terms, independent from the storage system as described hereinbefore, the invention is also related to a push chain, comprising a series of links, which are interconnected to each other through pivots which have pivot axes that alternatingly are perpendicular to each other, wherein portions of the links are adapted such that they interlock with portions of the neighbouring links such that when a compressive force is applied to the push chain, the links lock together in order to transfer a pushing force. An advantage of this push chain is that it can bend in two directions when it does not transfer a pushing force, which provides the opportunity to store the push chain in a compact manner. For example, a portion of the push chain may follow a helical path whereas another portion of the push chain extends within the helical path in a direction parallel to the centreline of the helical path.

The invention will hereafter be elucidated with reference to very schematic drawings showing an embodiment of the invention by way of example.

DETAILED DESCRIPTION OF THE INVENTION

Figure 1:
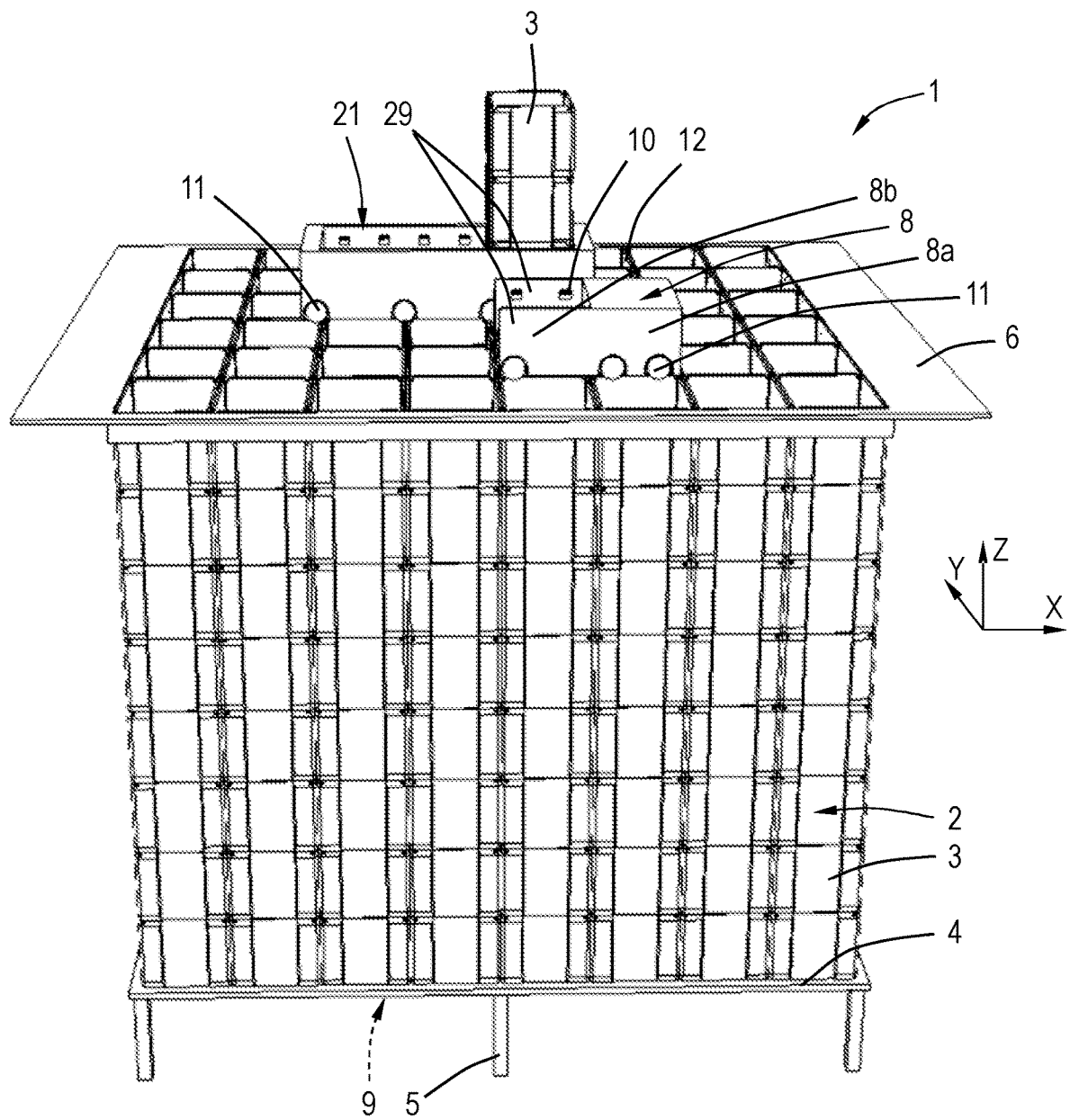
FIG. 1 is a perspective view of an embodiment of a storage system according to the invention.
Figure 2:
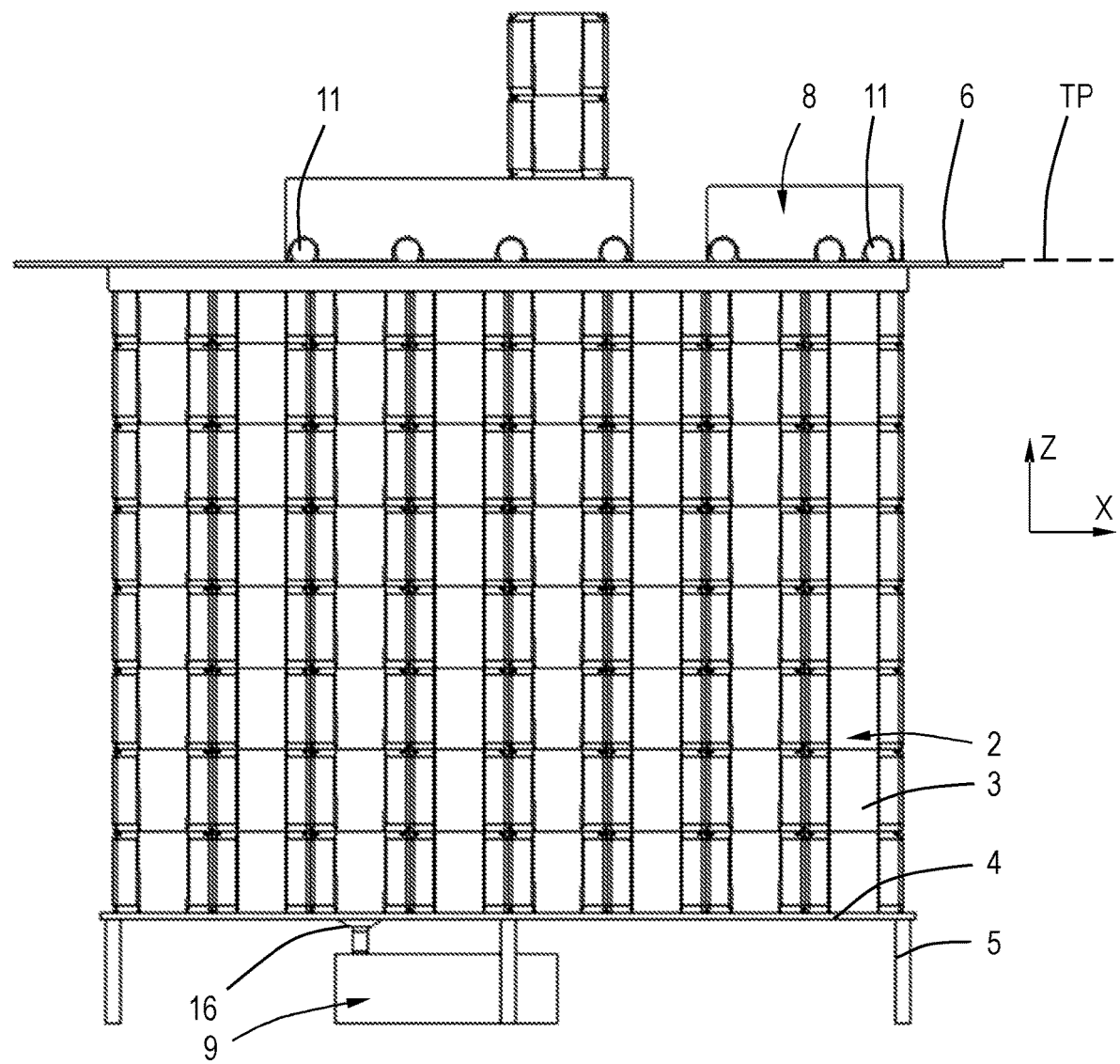
FIG. 2 is a side view of the embodiment as shown in FIG. 1.
Figure 3:
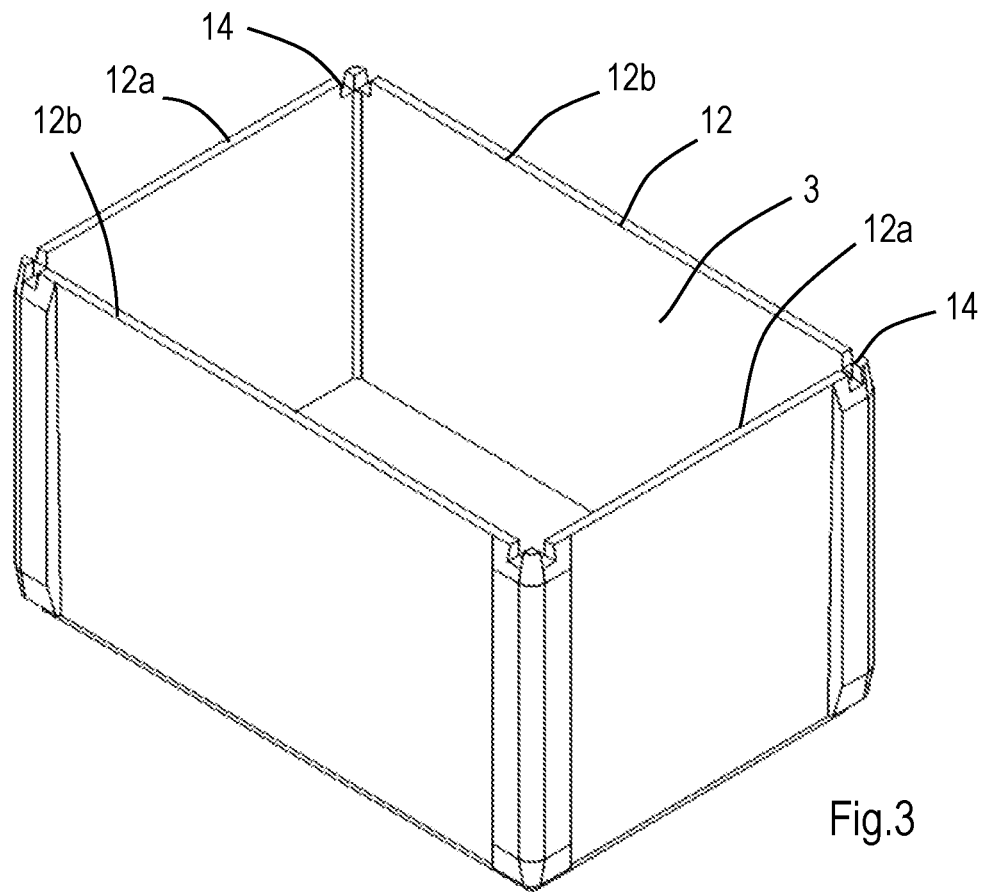
FIG. 3 is a perspective view of one storage container of the storage system as shown in FIG. 1.

FIGS. 1 and 2 show an embodiment of a storage system 1 according to the invention. The storage system 1 may be located in a warehouse and comprises a plurality of vertical stacks 2 of storage containers 3. An embodiment of a storage container 3 is shown in FIG. 3. The embodiment of FIG. 3 is open-topped and has a rectangular shape, but an alternative shape, such as a cube shape, is conceivable. The containers 3 may be arranged to interlock or engage with each other in the horizontal direction. The containers 3 may hold different products.

The stacks 2 are arranged in a horizontal first direction X and a horizontal second direction Y which is perpendicular to the first direction X, hence forming a three-dimensional matrix of storage containers 3. The stacks 2 rest on an elevated support 4 which is mounted on upright feet 5 at a surrounding edge thereof. This provides a free space below the support 4. At the upper sides of the stacks 2 the stacks 2 are enveloped by a frame 6 which is intended to keep the stacks 2 together. FIG. 2 shows that the upper sides of the stacks 2 lie in a horizontal top plane TP.

Figure 4:
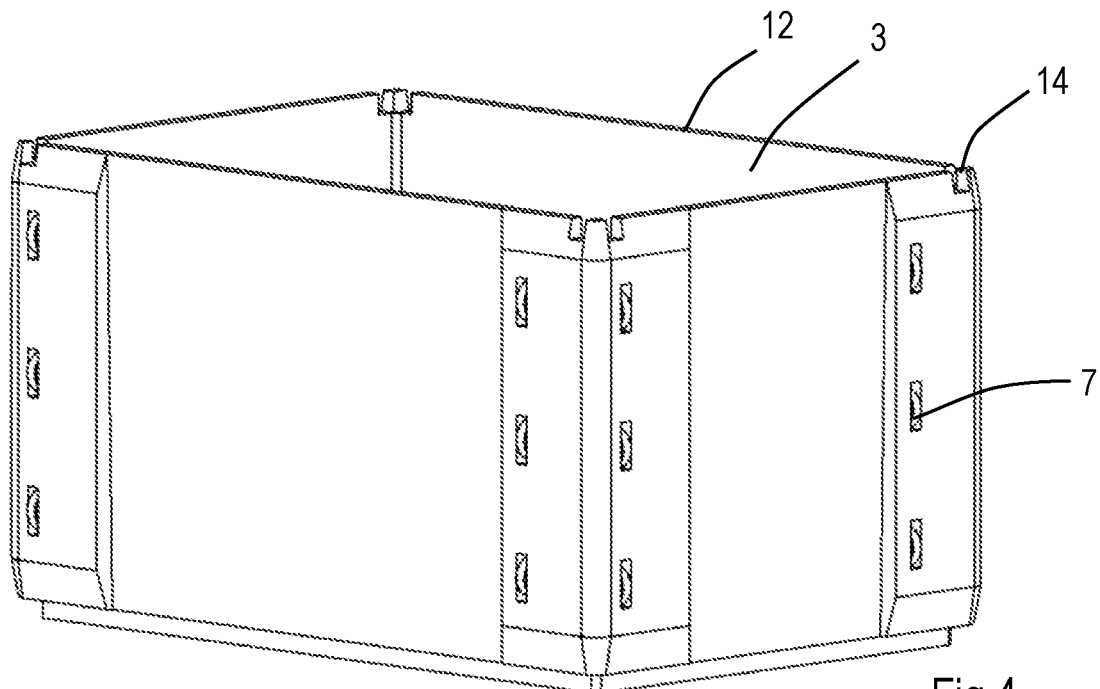
FIG. 4 is a similar view as FIG. 3, but showing an alternative embodiment of the storage container.

The outer sides of the containers 3 are free from any obstacles in order to allow the stacks 2 to be displaced vertically along each other. Since the stacks 2 are positioned close to each other or even against each other floor space is used efficiently. In order to minimize friction between the storage containers 3 when lifting a stack 2 the containers 3 may be provided with rollers 7 as shown in FIG. 4, but alternative friction reduction means are conceivable.

The storage system 1 is provided with a transport unit 8 for transporting at least one container 3 to or from a selected stack 2 in the first and/or second direction X, Y. The transport unit 8 has a base portion 8a and a container receiving portion 8b. The container receiving portion 8b has two parallel arms 29 between which a storage container 3 fits and an engaging member 10 for holding the storage container 3. The base portion 8a accommodates a power source in the form of a rechargeable battery and control means for driving the transport unit 8 and for controlling the engaging member 10.

Furthermore, the storage system 1 comprises a lifting member 9 for lifting a selected stack 2. The lifting member 9 has a non-lifting condition in which it is movable in horizontal direction below the support 4 and a lifting condition in which it supports a selected stack 2.

The engaging member 10 may comprise a gripper which is able to clamp at least one container 3 of a lifted stack 2, which container 3 projects above the other stacks 2 so as to retrieve that container 3. The engaging member 10 may be different, for example comprising pins that mate with corresponding holes in containers 3. The one or more empty places of the stack 2 after retrieving one or more containers 3 can be refilled by one or more other containers 3 by releasing one or more engaged containers 3 on top of the lifted stack 2. In the embodiment as shown the lifting member 9 and the engaging member 10 of the transport unit 8 together form a container handling device for transferring at least an upper container 3 from a selected stack 2 to the transport unit 8 before the transport unit 8 including the container 3 is transported away from the selected stack 2 and for transferring at least a container 3 from the transport unit 8 to the top of a selected stack 2 after the transport unit 8 including the container 3 is transported to the selected stack 2.

Alternatively, the container handling device may comprise a transport unit which is suitable to transport at least a container 3 in the first and/or second direction X, Y as well as to pick at least an upper container 3 from a selected stack 2 without lifting the stack 2. In this case the transport unit must be able to 'dig' into a selected stack 2 in order to pick a container 3.

Figure 34:
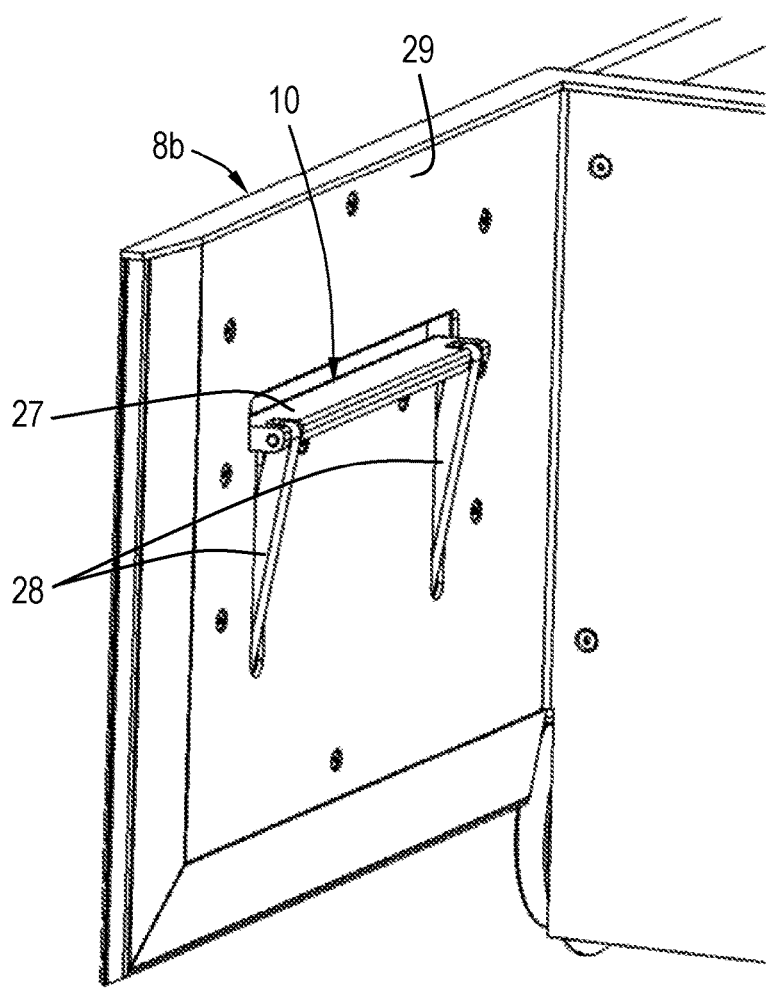
FIG. 34 is a similar view as FIG. 1, but showing a part of a transport unit thereof on a larger scale, illustrating a part of an embodiment of the engaging member.
Figure 35:
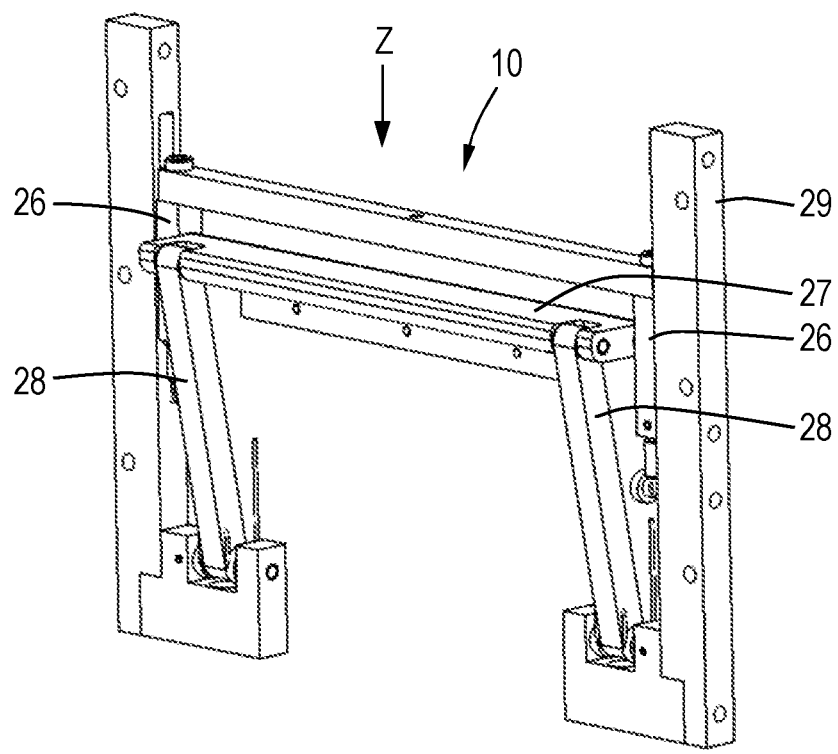
FIG. 35 is a similar view as FIG. 34, but showing a part thereof on a larger scale.
Figure 36:
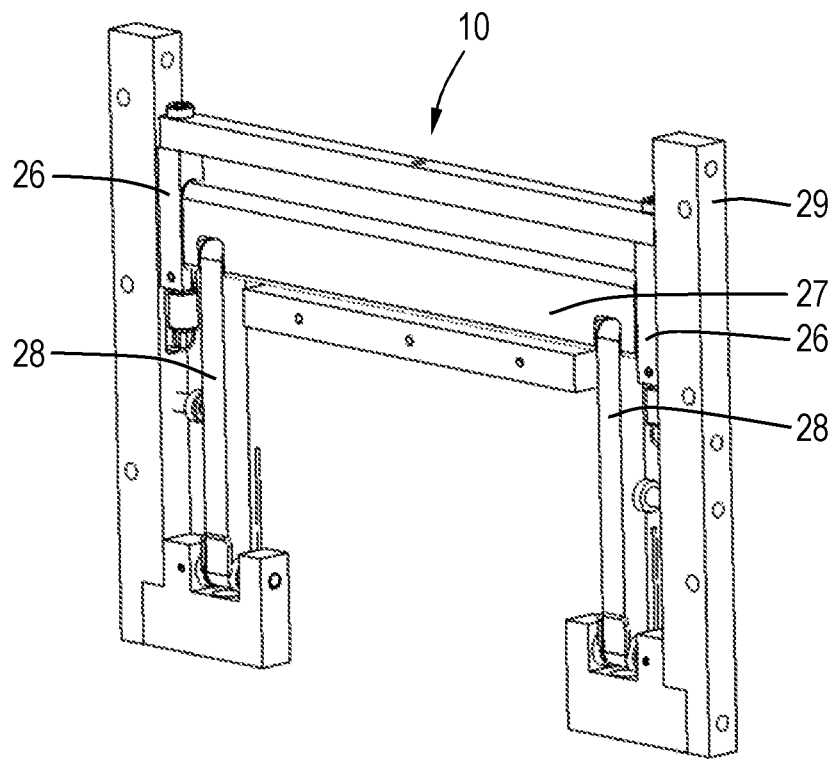
FIG. 36 is a similar view as FIG. 35, but illustrating the engaging member in a different condition.

FIGS. 34-36 show a part of an embodiment of an engaging member 10 in more detail. This embodiment of the engaging member 10 comprises a slider-crank linkage. Considering one of the two arms 29 of the container receiving portion 8b, as shown in FIG. 34, two sliders 26 are mounted to the arm 29 and movable with respect to the arm 29 in vertical direction. The linkage has a connecting rod in the form of a plate-shaped holder 27. First portions of the holder 27 are rotatably mounted to the respective sliders 26. Second portions of the holder 27 which are remote from its first portions are rotatably mounted to first portions of respective cranks 28 of the slider-crank linkage. Second portions of the respective cranks 28 which are remote from its first portions are rotatably mounted to the corresponding arm 29.

FIGS. 34 and 35 show the engaging member 10 in an active condition in which the plane of the rod 27 extends horizontally and FIG. 36 shows the engaging member 10 in a passive condition in which the plane of the holder 27 extends vertically. In the latter condition the cranks 28 extend vertically, as well. This provides space for receiving a container 3. If the container 3 needs to be engaged by the transport unit 8 the sliders 26 can be moved downwardly as indicated by arrow Z in FIG. 35. The holders 27 at the opposite arms 29 are movable towards each other so as to engage a container 2 between the arms 29.

The slider-crank linkage may be adapted such that the sliders 26 are automatically in a lower position without operating the engaging member 10, whereas an actuator pulls the sliders 26 upwardly in order to move the engaging member 10 in a de-activated condition.

FIGS. 1 and 2 show that the transport unit 8 comprises first wheels 11 located at opposite sides of the transport unit 8. The first wheels 11 run on upper rims 12 of the upper containers 3 for travelling in X direction. Although not visible in FIGS. 1 and 2 the transport unit 8 is also provided with second wheels 13 for travelling in Y direction, see FIG. 5. The first and second wheels 11, 13 can be lifted and lowered such that either the first wheels 11 or the second wheels 13 are directly supported by the upper containers 3 of the stacks 2. The first and second wheels 11, 13 are drivable via electric motors that may be powered by a battery located at the base portion 8a of the transport unit 8.

Figure 5:
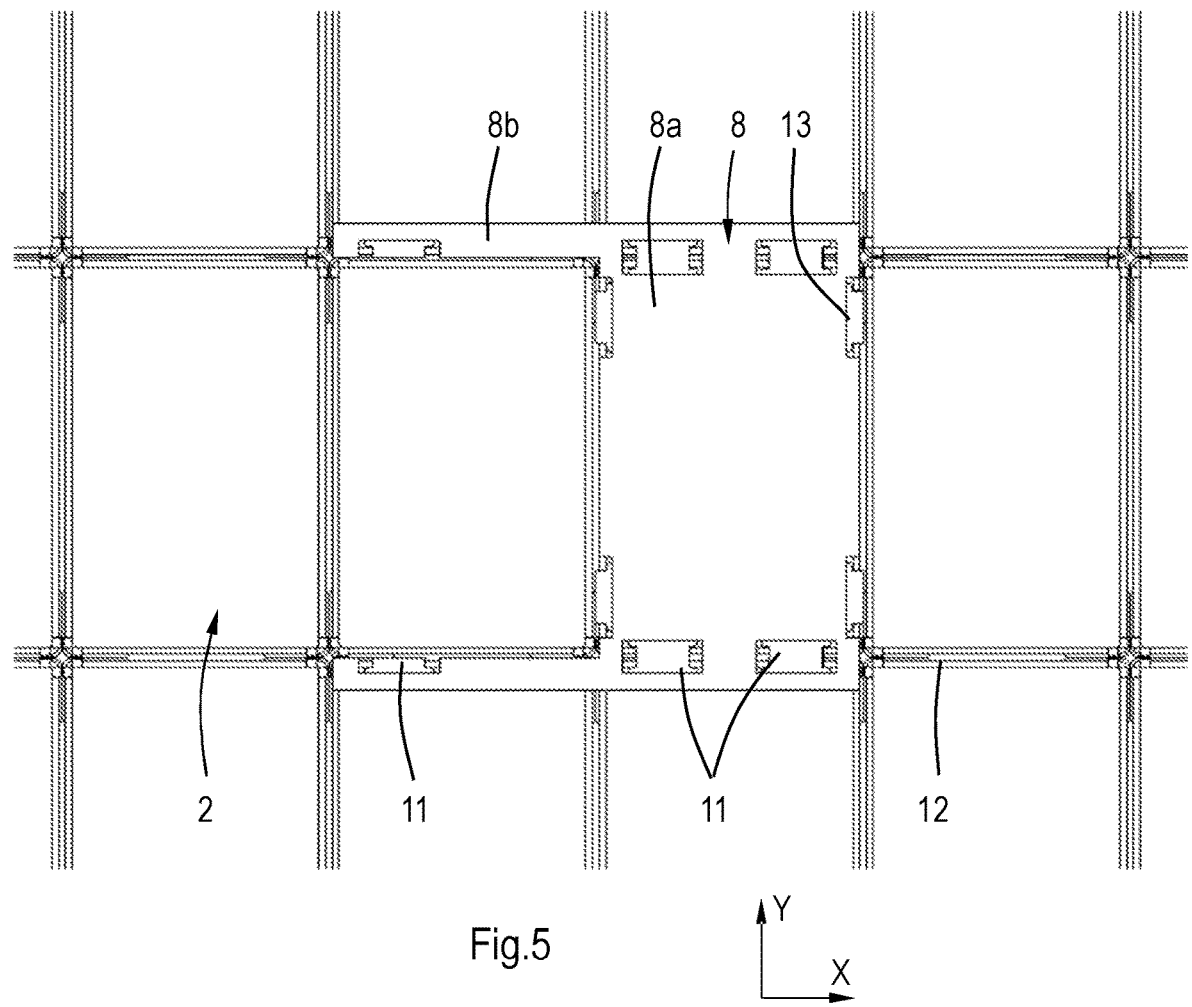
FIG. 5 is a top view of a part of the storage system as shown in FIG. 1.

The width of the transport unit 8 as measured in the second direction Y corresponds to the width of one row of stacks 2 extending in the first direction X. FIG. 5 shows a part of the storage system 1 as seen from above at a level which intersects the wheels 11, 13 of the transport unit 8. FIG. 5 shows how the wheels 11, 13 cooperate with the upper rims 12 of the containers 3. Each of the wheels 11, 13 has a supported portion which can run on top of the rims 12 at either side of a row. In the condition as shown in FIG. 5 the first wheels 11 are running on the rims 12 in X direction whereas the second wheels 13 are lifted with respect to the stacks 2 above the top plane TP. The pair of first wheels 11 which are located at the container receiving portion 8b are provided with respective flanges that are located beyond the rims 12 of the adjacent containers 3 at either side of the row and their supported portions run on the rims 12 of the adjacent containers 3. An advantage of running on the rims 12 of adjacent containers 3 is that the transport unit 8 can still travel across the row where an upper container 3 is missing because of being retrieved by the transport unit 8. Besides, if a container 3 must be engaged the first wheels 11 at the container receiving portion 8b of the transport unit 8 may not rest on that container 3. In the embodiment as shown in FIG. 5 each of the first wheels 11 which are located at the base portion 8a of the transport unit 8 has two flanges at opposite sides of its supporting portion. The supporting portion of each of these first wheels 11 rests on two rims 12 of adjacent containers 3.

The second wheels 13 run on the upper rims 12 of the containers 3 above which the base portion 8a of the transport unit 8 is located. The respective single flanges of the second wheels 13 are located at the inner sides of these upper rims 12.

Figure 6:
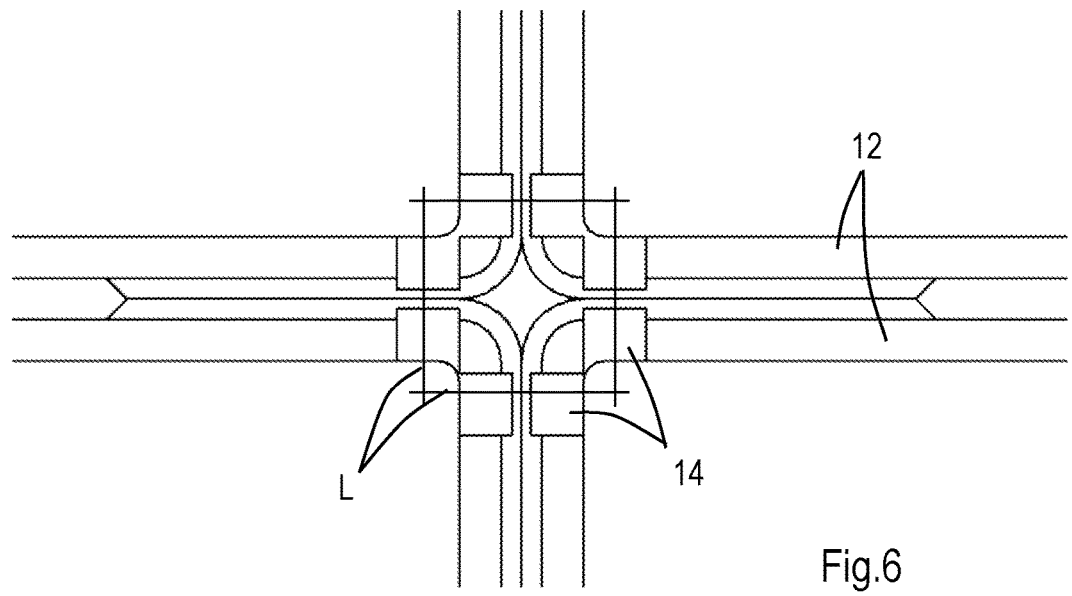
FIG. 6 is a similar view as FIG. 5 on a larger scale, showing a part of the upper side of the storage system.
Figure 7:
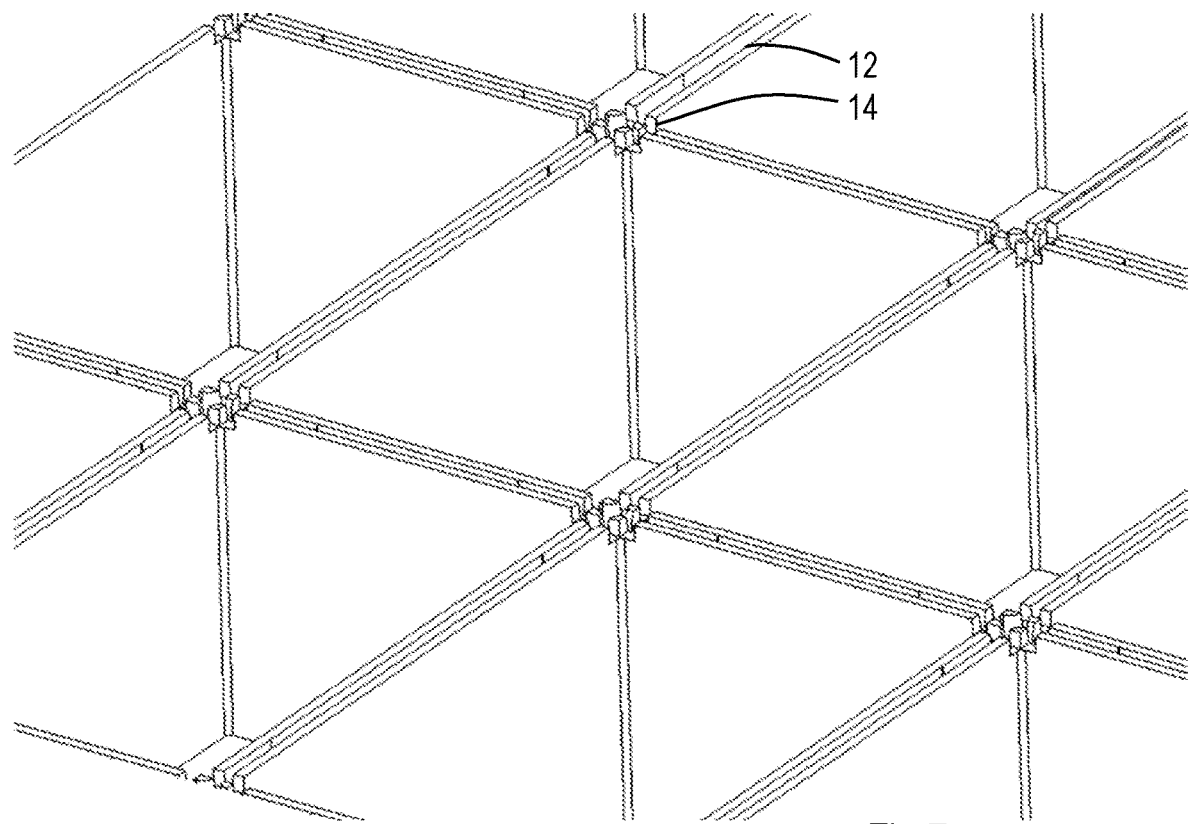
FIG. 7 is a perspective view of a part of the storage system as shown in FIG. 1.
Figure 8:
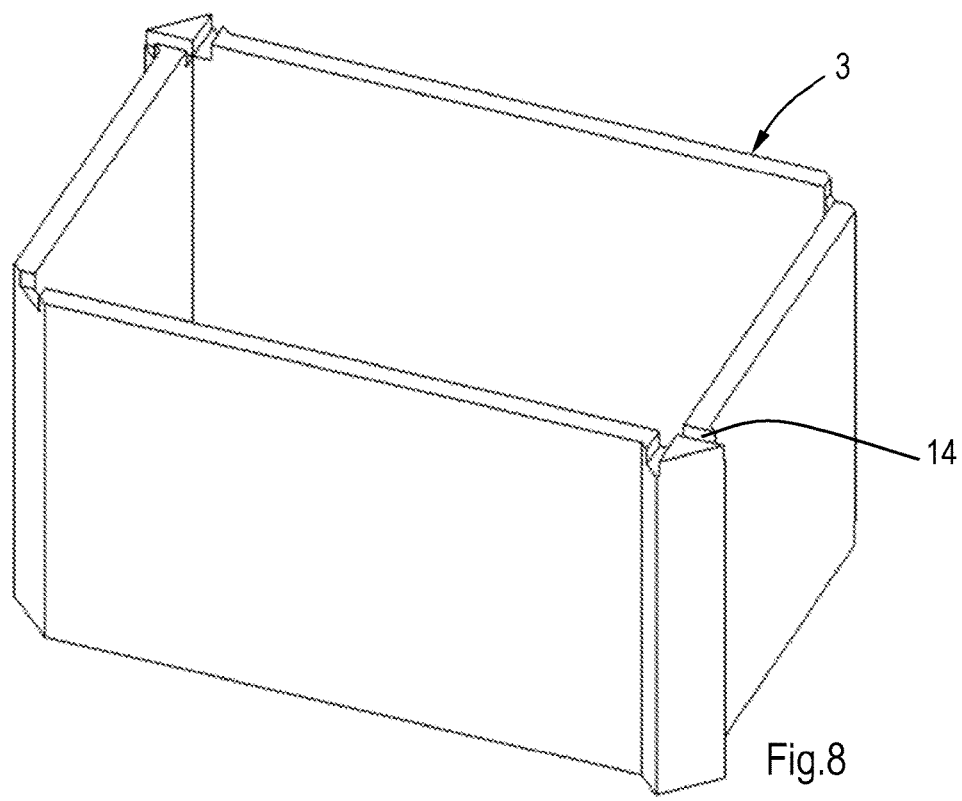
FIG. 8 is a similar view as FIG. 3, but showing an alternative embodiment of the storage container.
Figure 9:
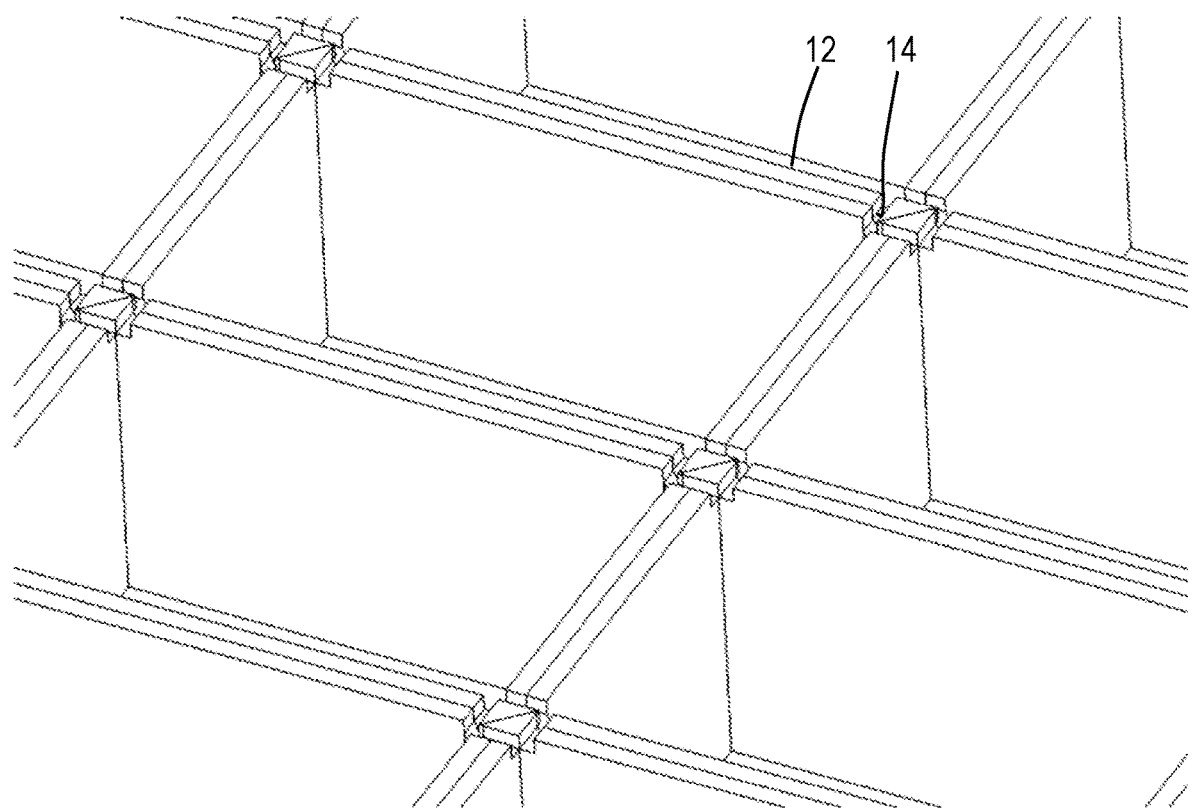
FIG. 9 is a similar view as FIG. 7, but showing the storage system with storage containers as shown in FIG. 8.

The upper rim 12 of each container 3 is provided with recesses 14 in order to allow the flanges of the wheels 11, 13 to cross portions of upper rims 12 of adjacent stacks 2, which portions extend in transverse direction with respect to the direction of actual displacement of the transport unit 8. This is illustrated in FIG. 6 by lines L which indicate the paths followed by the flanges. FIG. 7 further clarifies that the flanges of the wheels 11, 13 can pass a plurality of stacks 2 without being obstructed by the rims 12. FIGS. 8 and 9 show an alternative storage container 3.

FIG. 3 illustrates that the circumferential upper rim 12 has a first pair of parallel rim portions 12a and a second pair of parallel rim portions 12b which extend perpendicular to the first pair of parallel rim portions 12a. Each of the rim portions 12a of the first pair is provided with recesses 14 at or close to inner sides of the rim portions 12b of the second pair, which inner sides are directed to each other.

Figure 37:
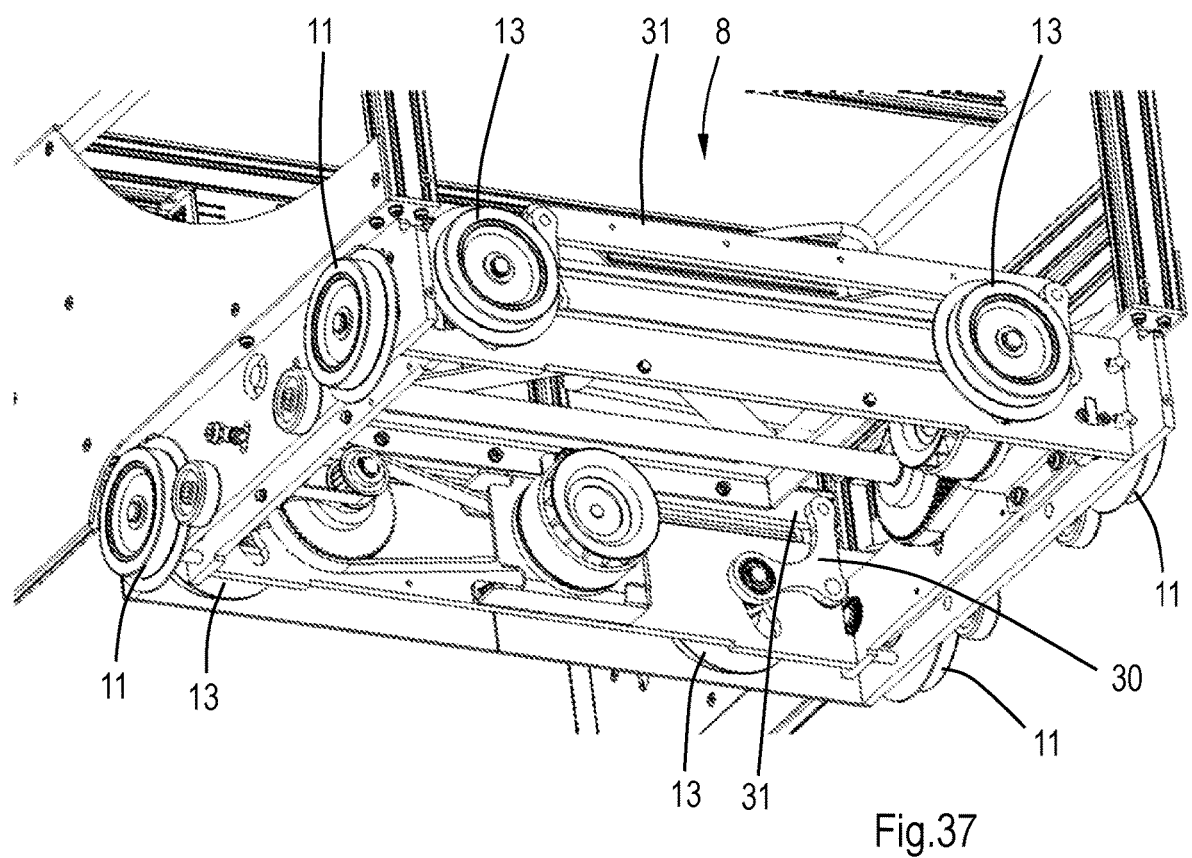
FIG. 37 is a perspective view of an alternative embodiment of the transport unit of the storage system.
Figure 38:
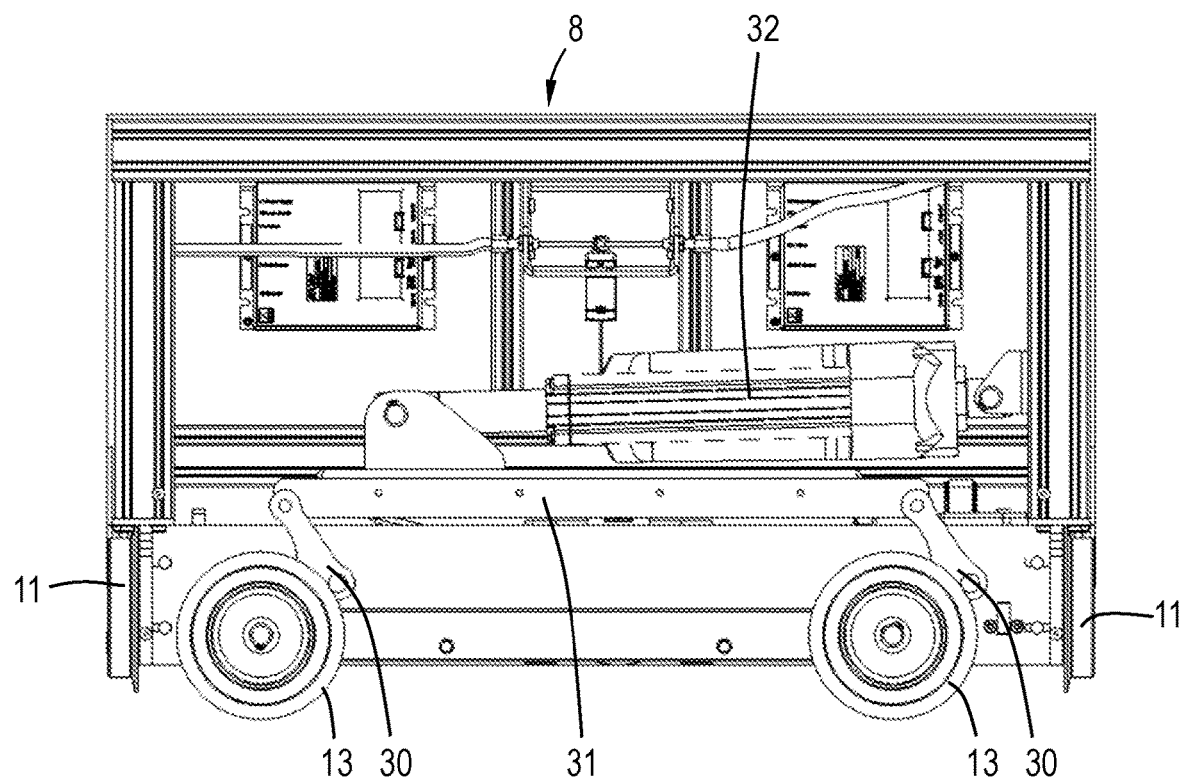
FIG. 38 is a side view of the transport unit of FIG. 37.
Figure 39:
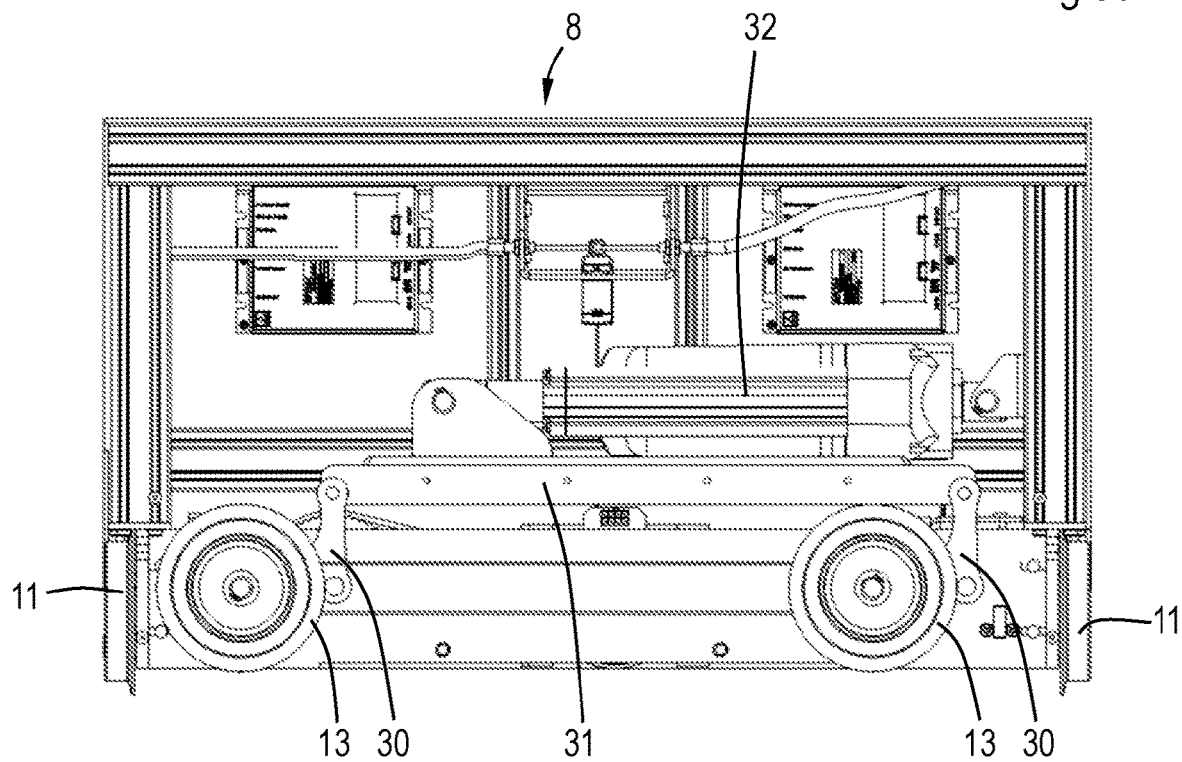
FIG. 39 is a similar view as FIG. 38, but showing the transport unit in a different condition.

FIG. 37-39 show an alternative embodiment of the transport unit 8. This embodiment also comprises the first wheels 11 located at opposite sides of the transport unit 8 for travelling in X direction and the second wheels 13 for travelling in Y direction. Only the second wheels 13 can be lifted and lowered with respect to the remainder of the transport unit 8. In a lifted condition as shown in FIG. 39 the first wheels 11 will be supported by the stacks 2 or by rails of a grid pattern in case of a grid pattern across the top of the stacks 2. In a non-lifted condition as shown in FIG. 38 the second wheels 13 will be supported by the stacks 2 or by rails of a grid pattern in case of a grid pattern across the top of the stacks 2.

Each of the second wheels 13 has a shaft which is mounted eccentrically to the remainder of the transport unit 8. In the embodiment as shown in FIGS. 37-39 each pair of second wheels 13 at one side of the transport unit 8 are mounted eccentrically to the remainder of the transport unit 8 through respective bifurcated levers 30, which are coupled to a rod 31. The rod 31 is also coupled to a linear actuator 32 for driving the rod 31 in its longitudinal direction. The linear actuator 32 is mounted to the remainder of the transport unit 8. In a retracted condition of the linear actuator 32 the second wheels 13 are lifted, as illustrated in FIG. 39.

Figure 10:
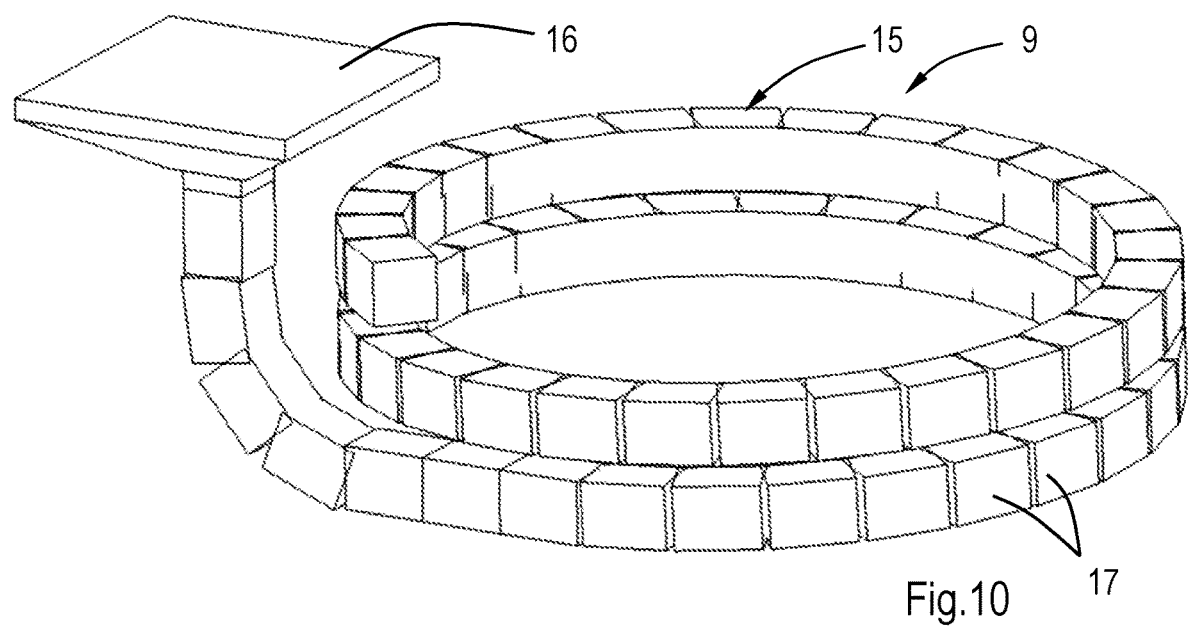
FIG. 10 is a perspective view of an embodiment of a lifting member according to the invention, showing a non-lifting condition.
Figure 11:
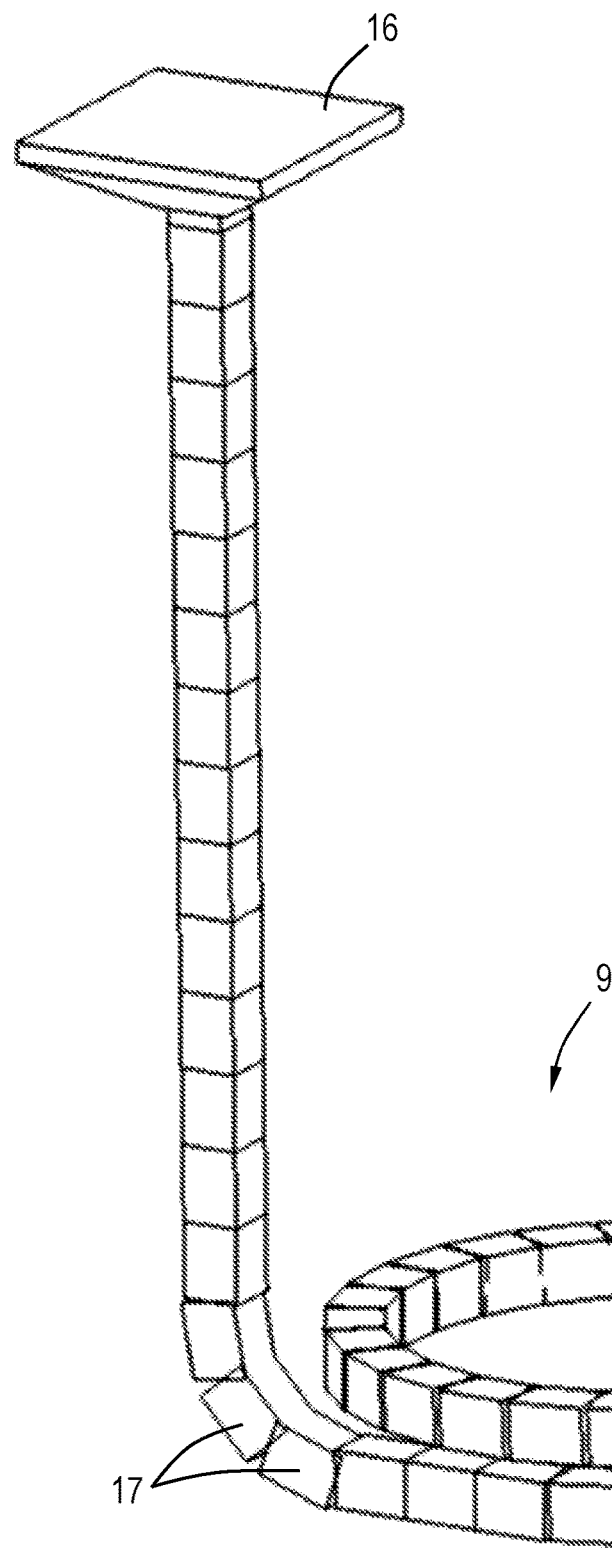
FIG. 11 is a similar view as FIG. 10, but showing a lifting condition.

The lifting member 9 comprises a drivable push chain 15 which has a supporting element 16 at its end for contacting a lower end of a selected stack 2. An embodiment of the push chain 15 is shown in FIGS. 10-13. FIG. 10 shows the push chain 15 in a non-lifting condition, in which the supporting element 16 is at its lowest level. FIG. 11 shows a lifting condition in which the supporting element 16 is elevated. The upper surface of the supporting element 16 may be such that a container 3 is nested on the supporting element 16 in a similar way as on another container 3.

Figure 12:
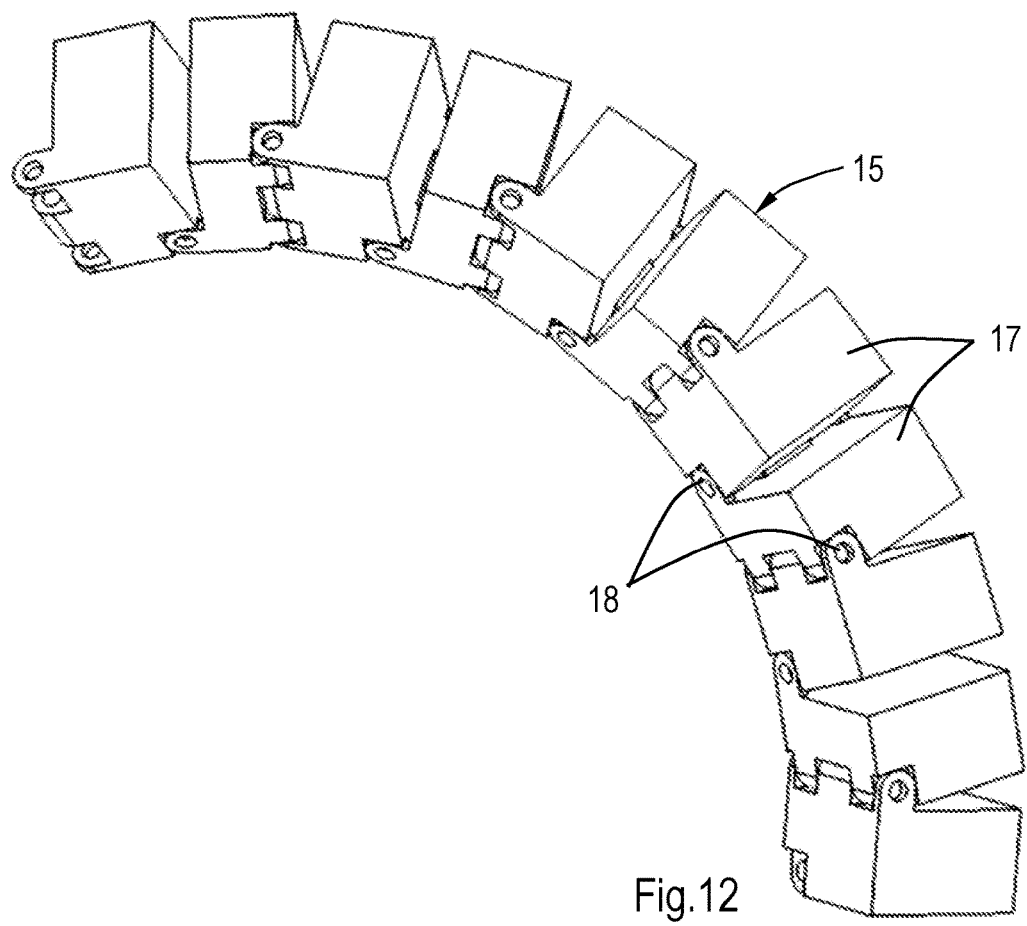
FIGS. 12 and 13 are enlarged perspective views of parts of the lifting member as shown in FIGS. 10 and 11.
Figure 13:
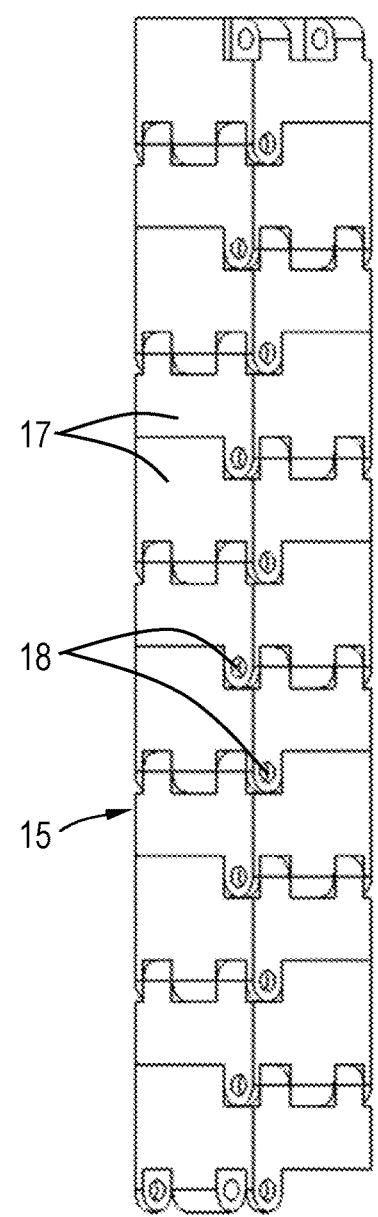

FIGS. 12 and 13 show parts of the push chain 15 in greater detail. The push chain 15 comprises a series of links 17. The links 17 are interconnected to each other through pivots 18 which have pivot axes that alternatingly are perpendicular to each other. Portions of the links 17 are designed to interlock with portions of the neighbouring links 17 such that when a thrust or compressive force is applied to the push chain 15, the links 17 lock together so that the push chain 15 can transfer a pushing force. This condition is shown in FIG. 13. Without applying a pushing force, the push chain 15 acts as a chain which can bend in two directions which are perpendicular to each other as illustrated in FIG. 12. The push chain 15 follows a curved path when all the stacks 2 rest on the support 4 and the supporting element 16 is at its lowest level, see FIG. 10. In the embodiment as shown in FIG.

10 the push chain 15 follows a helical path. Due to the curved path the push chain 15 can be stored in a compact way which provides a great freedom of moving the lifting member 9 below the support 4. The lifting member 9 may be provided with a guide for guiding the push chain 15 along a desired path.

Figure 28:
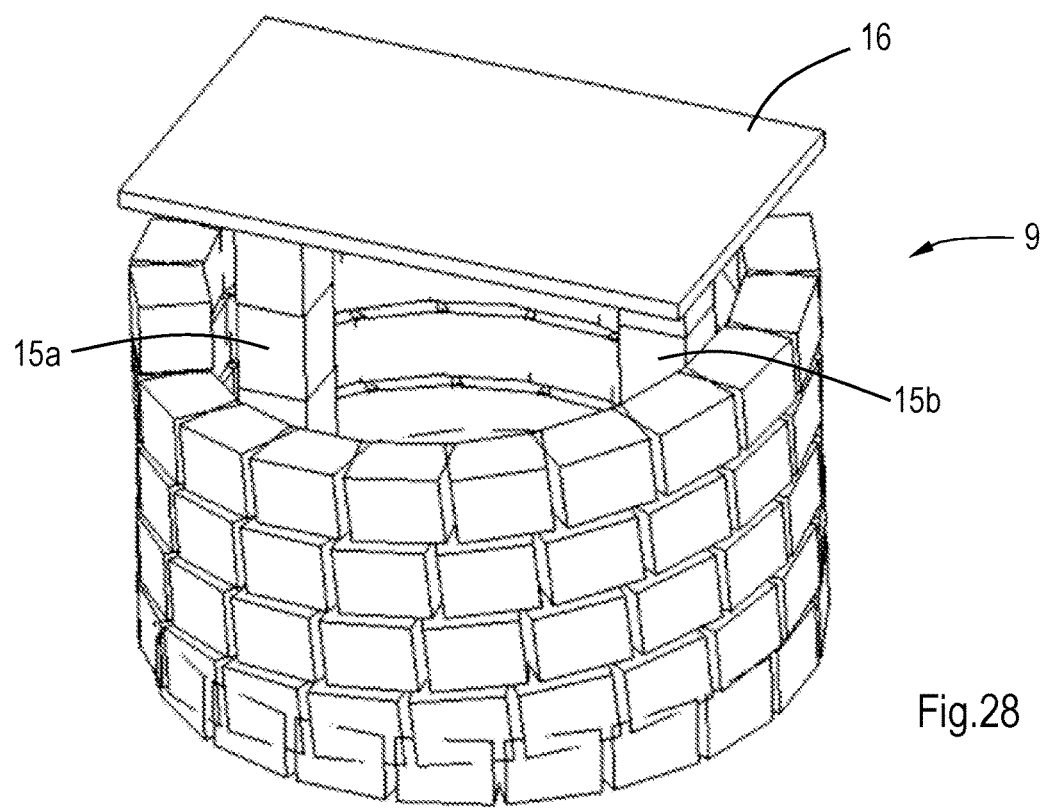
FIGS. 28 and 29 are a perspective view and a plan view, respectively, of an alternative lifting member.
Figure 29:
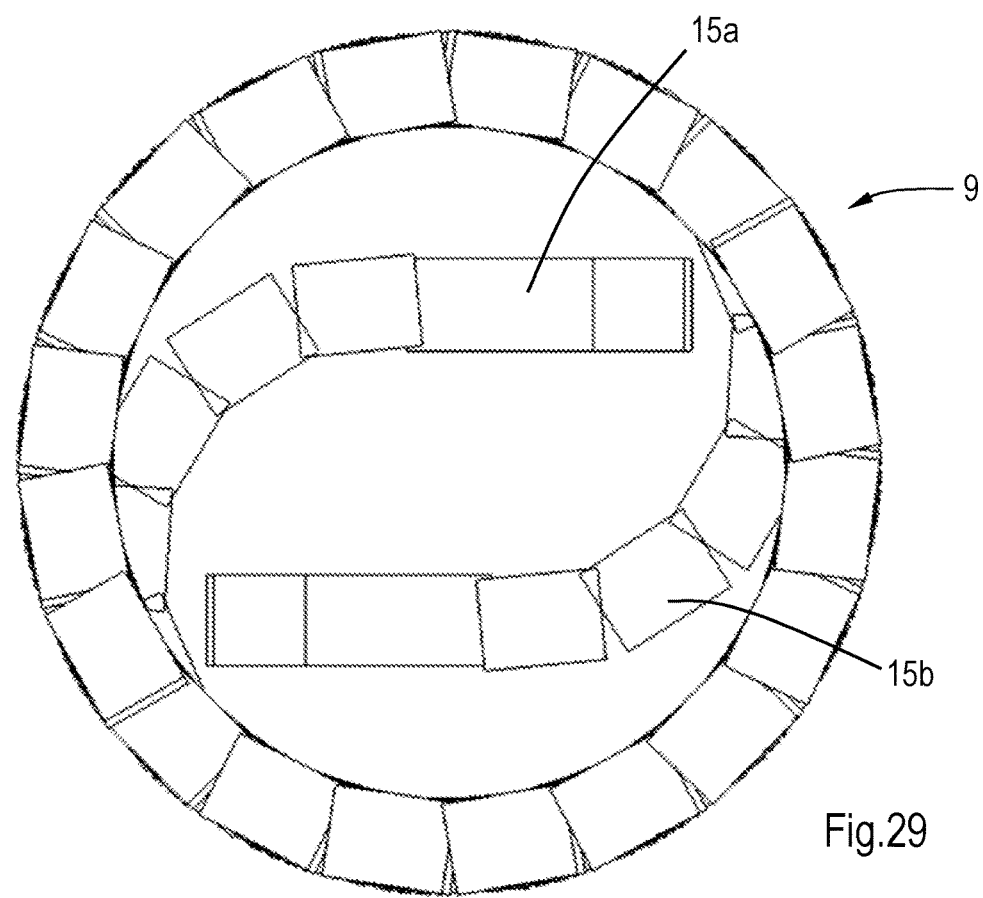

FIGS. 28 and 29 show an alternative embodiment of the lifting member 9. FIG. 28 shows that this embodiment has two push chains 15a and 15b which support the supporting element 16 at two locations that are located at a distance from each other, hence creating a stable support. In the non-lifting condition the push chains 15a, 15b follow helical paths and, in this case, form a common cylinder about vertically extending end portions of the push chains 15a, 15b, on which end portions the supporting element 16 is mounted. For clarity reasons, the supporting element 16 is not shown in FIG. 29. It is noted that the vertically oriented end portion of the push chain 15 in the embodiment as shown in FIGS. 10 and 11 may also be located within the helical path that is formed by another portion of the push chain 15.

Figure 14:
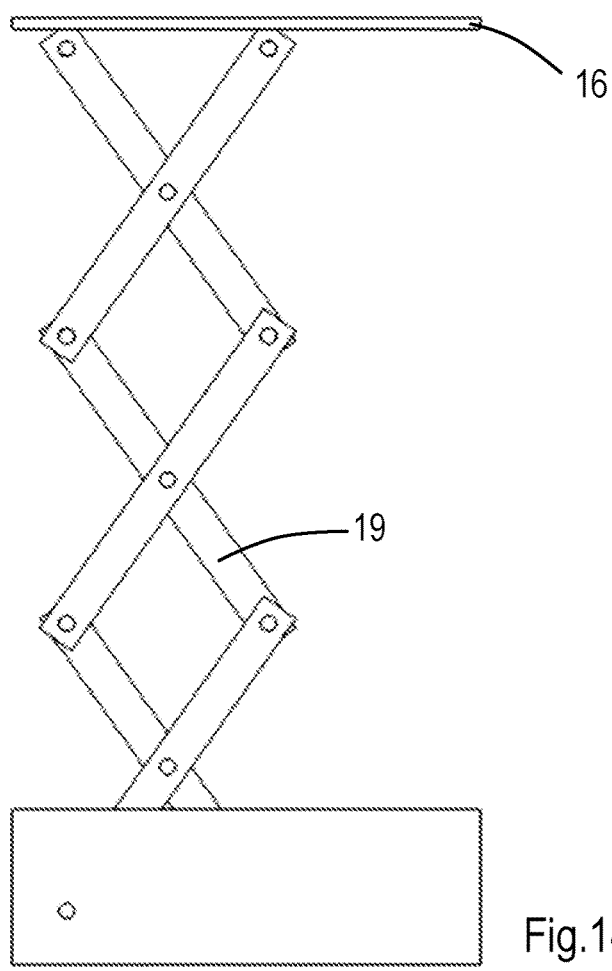
FIGS. 14 and 15 are side views of alternative embodiments of the lifting member.
Figure 15:
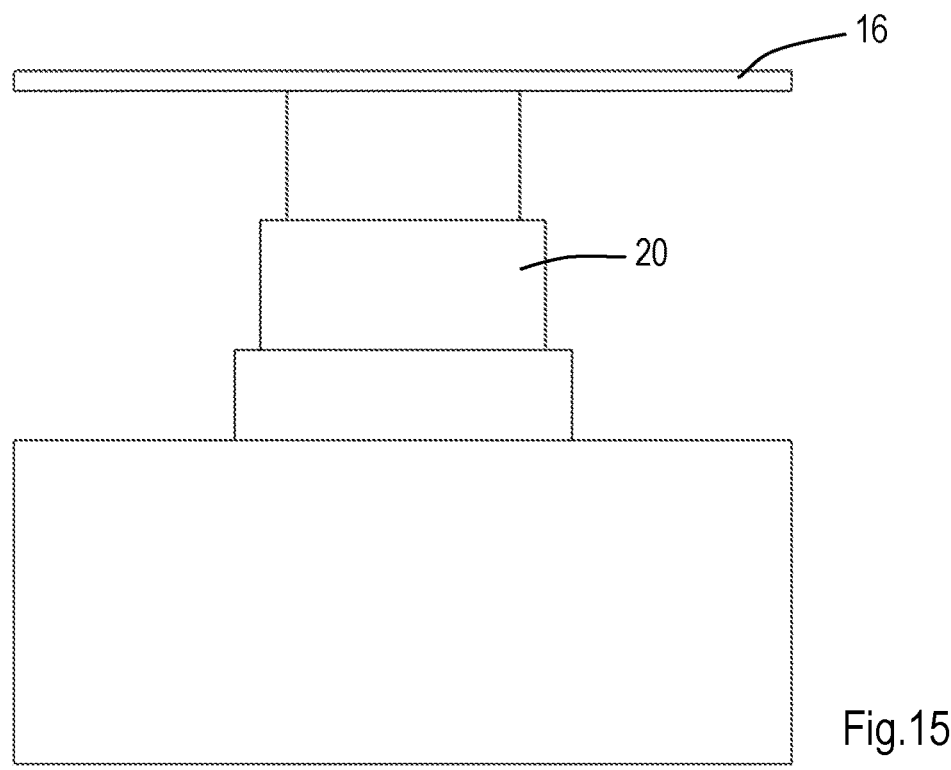

FIGS. 14 and 15 show alternative lifting members, in which the push chain is replaced with a scissor lift 19 and a telescopic lift 20, respectively.

Figure 31:
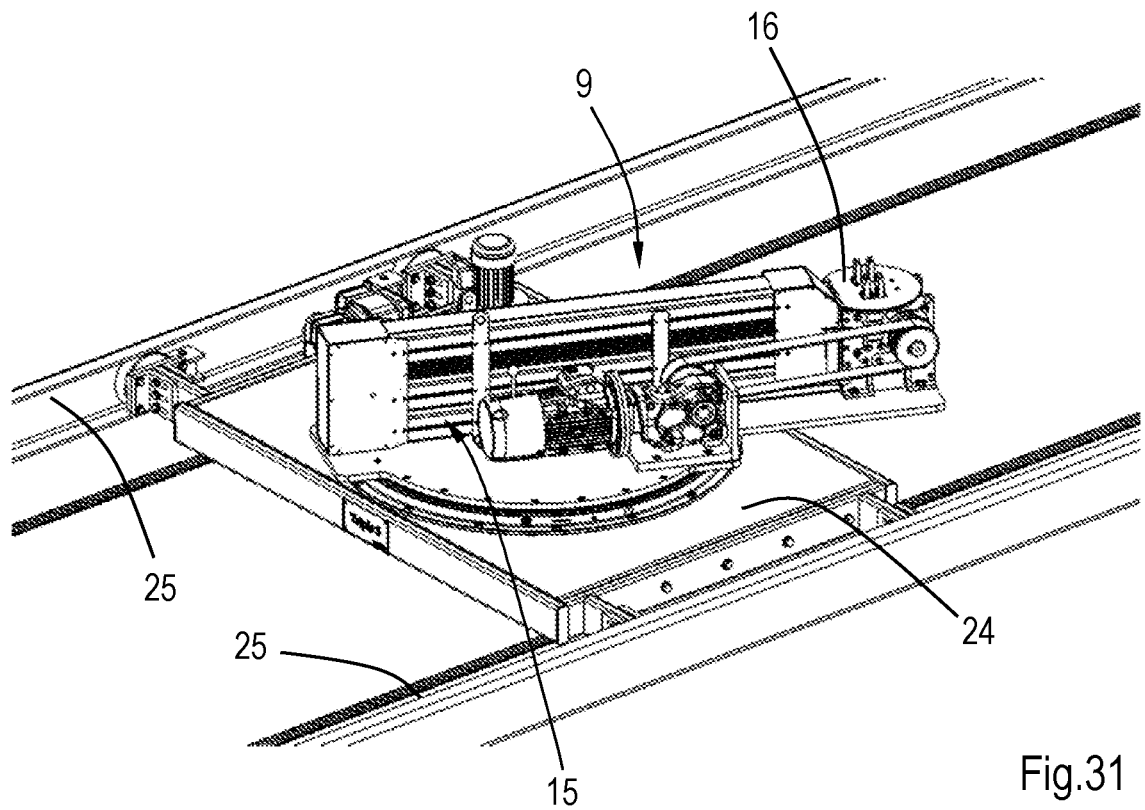
FIG. 31 is a similar view as FIG. 10, but showing an alternative embodiment of the lifting member in a non-lifting condition.
Figure 32:
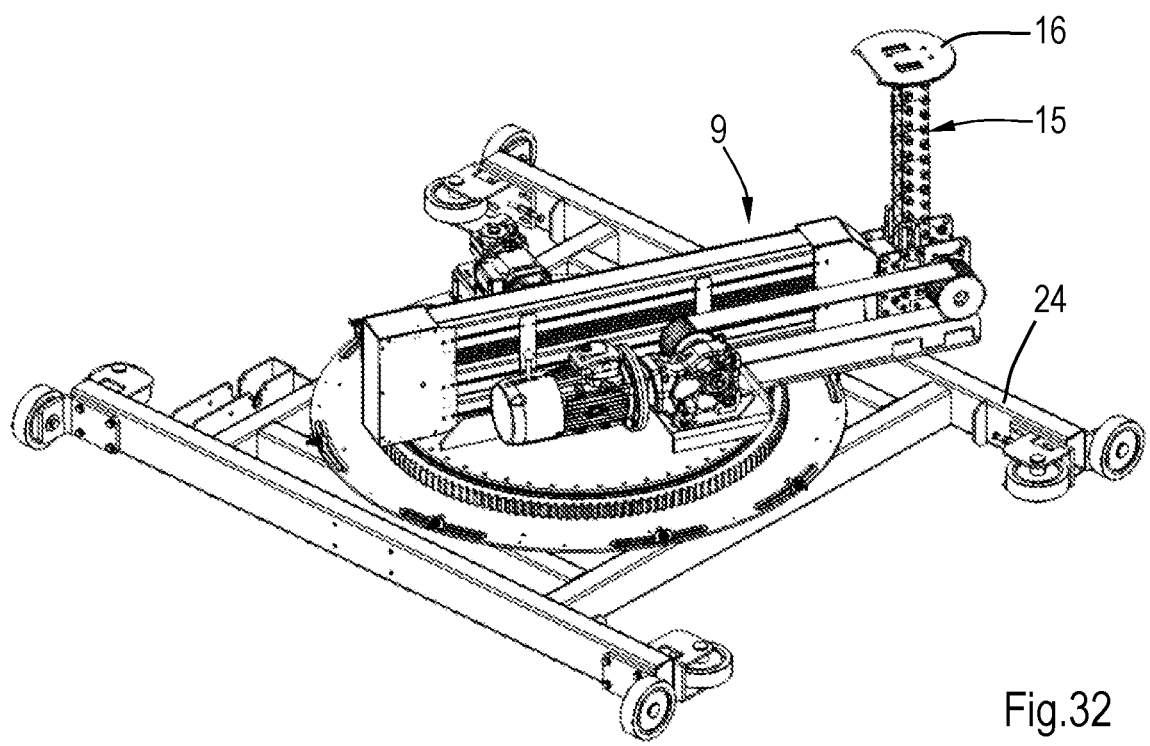
FIG. 32 is a similar view as FIG. 31, but showing a lifting condition.
Figure 33:
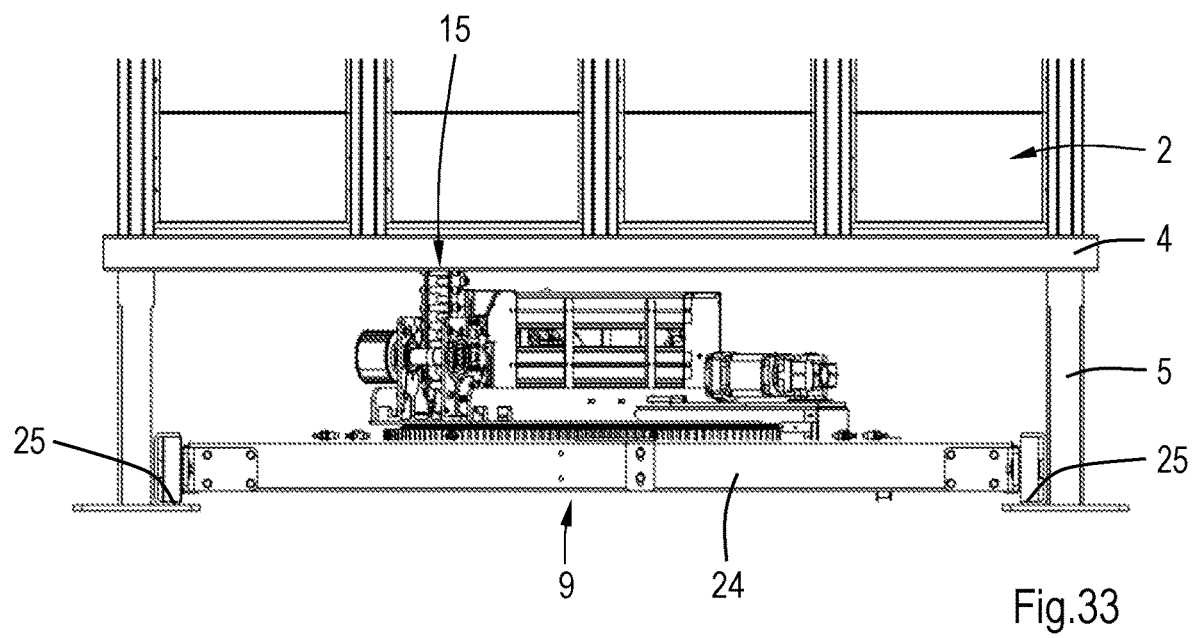
FIG. 33 is a side view of the lifting member as shown in FIGS. 31 and 32.

FIGS. 31-33 show another alternative lifting member 9. In this case the drivable push chain 15 is mounted on a carriage 24. The carriage 24 is guidable along a linear guide in the form of parallel rails 25 which are located below the support 4 of the stacks 2. The rails 25 may extend parallel to a row of stacks 2 in the first direction X or the second direction Y. An alternative guide is conceivable. The drivable push chain 15 is bendable in one direction and movable within a vertical plane. The vertical plane is rotatable with respect to the carriage 24 about a vertical axis of rotation. The push chain 15 is guided such that it follows a horizontal and a vertical path during lifting a stack 2. The vertical path is located at a distance from the axis of rotation. Hence, the supporting element 16 is located at a distance from the vertical axis of rotation such that a neighbouring stack 2 of a stack 2 below which the carriage 24 is located can be lifted. The distance may be equal to the width of a stack for example, such that in case the position of the lifting member 9 below the stacks 2 is such that the axis of rotation is located at a centre of the stack 2, the supporting element 6 can be placed below four neighbouring stacks 2.

FIG. 33 shows that the support 4 carries the stacks 2 of containers 3 such that the lifting member 9 can move below the stacks 2 without obstacles.

FIGS. 1 and 2 also show an auxiliary transport unit 21 which is larger than the transport unit 8. The auxiliary transport unit 21 is intended for temporarily storing containers 3 if the transport unit 8 needs to fetch a container 3 which is located at a low position in a stack 2. The auxiliary transport unit 21 is also provided with first and second wheels and engaging members, similar to the transport unit 8, but it moves slower due to its size. FIGS. 1 and 2 show that the auxiliary transport unit 21 can receive and hold three stacks of containers 3. Nevertheless, it is possible to operate the storage system 1 without the presence of the auxiliary transport unit 21. In that case the transport unit 8 can take one or more containers 3 which are located above a target container 3 and temporarily store the one or more containers on top of another stack 2. It is clear that this leads to a less efficient container handling than in case of the presence of the auxiliary transport unit 21.

Figure 16:
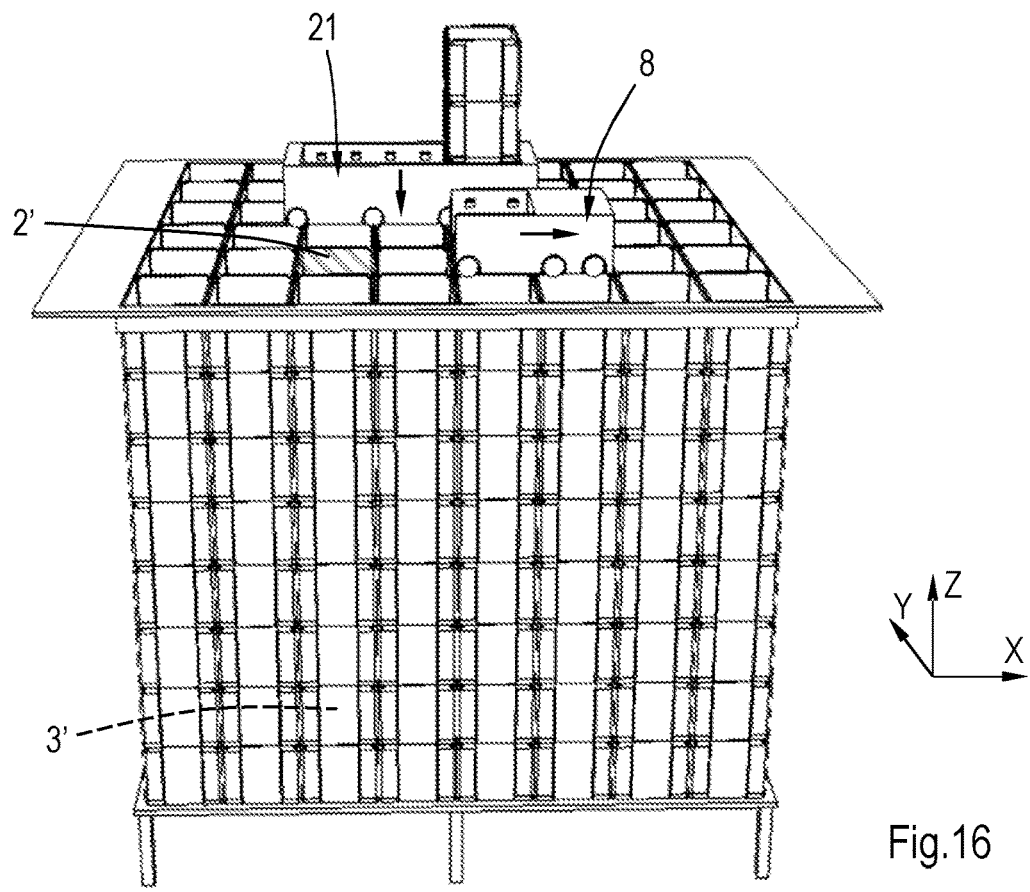
FIGS. 16-25 are illustrative perspective views, showing the functioning of the storage system.

FIGS. 16-25 illustrate the functioning of the storage system 1 under operating conditions. FIG. 16 indicates a target storage container 3' in a target stack 2' which target container 3' must be fetched by the transport unit 8. The target container 3' is located in the third stack 2' in the first direction X as seen from the left, in the second stack 2' in the second direction Y as seen from the front to the back and the seventh level in vertical direction Z as seen from above. For clarity reasons one stack 2 at the front side has been eliminated in FIGS. 17-25 such that the target container 3' can be made visible.

An arrow in FIG. 16 indicates that the auxiliary transport unit 21 starts to move in the second direction Y from the back towards the front and the transport unit 8 starts to move to the right. The auxiliary transport unit 21 has already three storage containers 3 in this condition, but this may be less or more.

Figure 17:
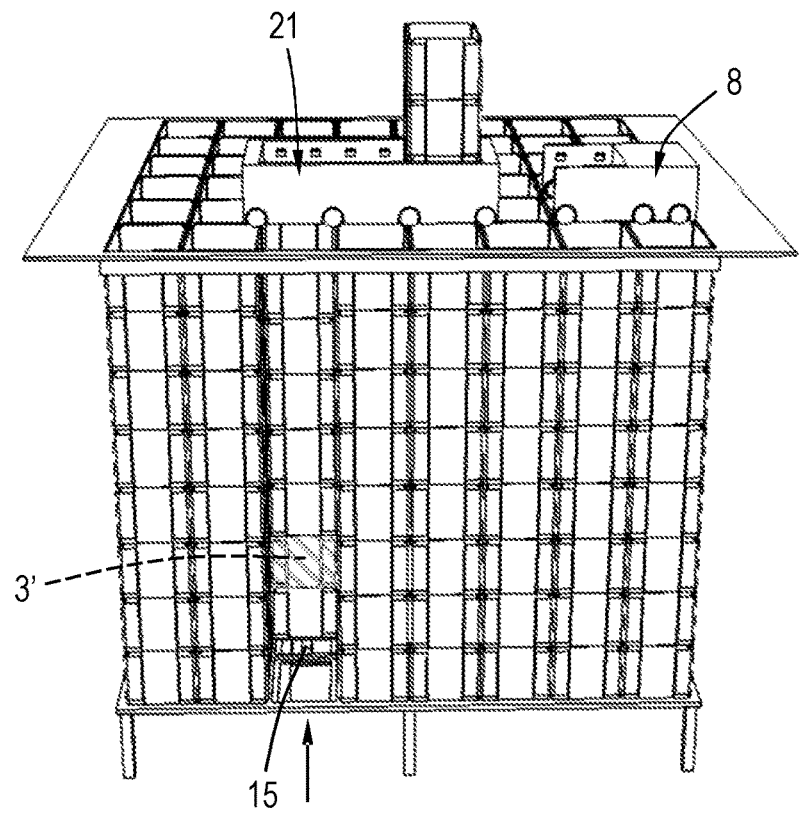
Figure 18:
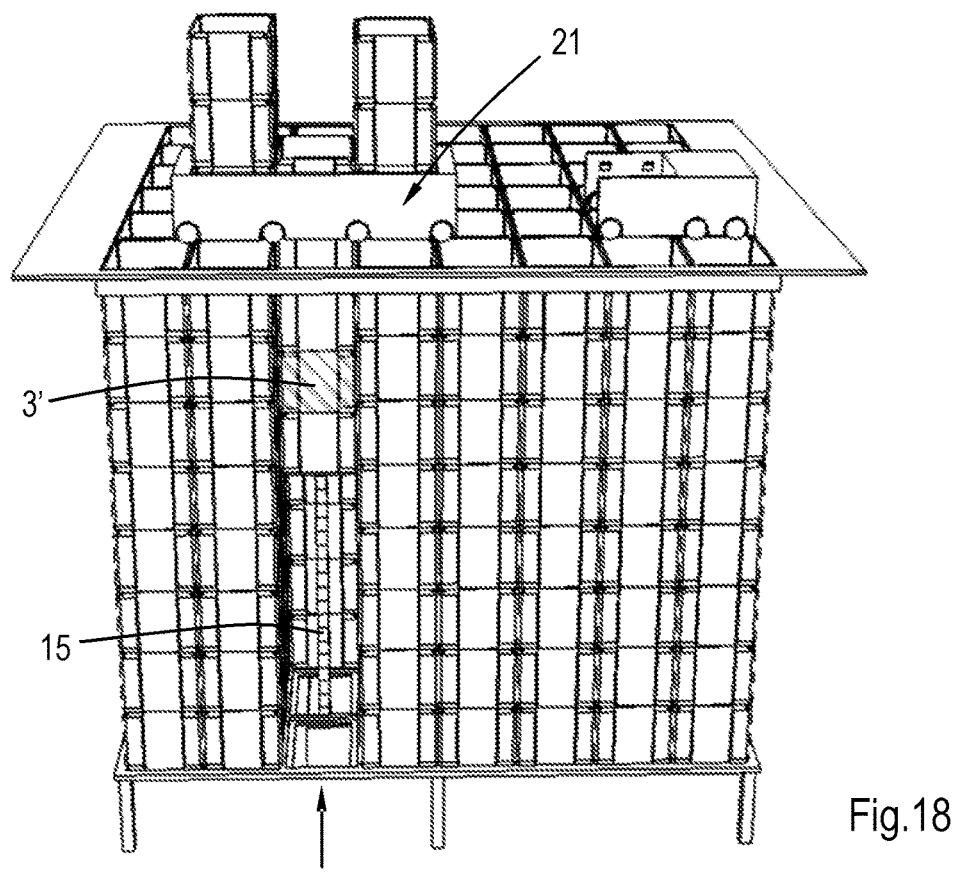
Figure 19:
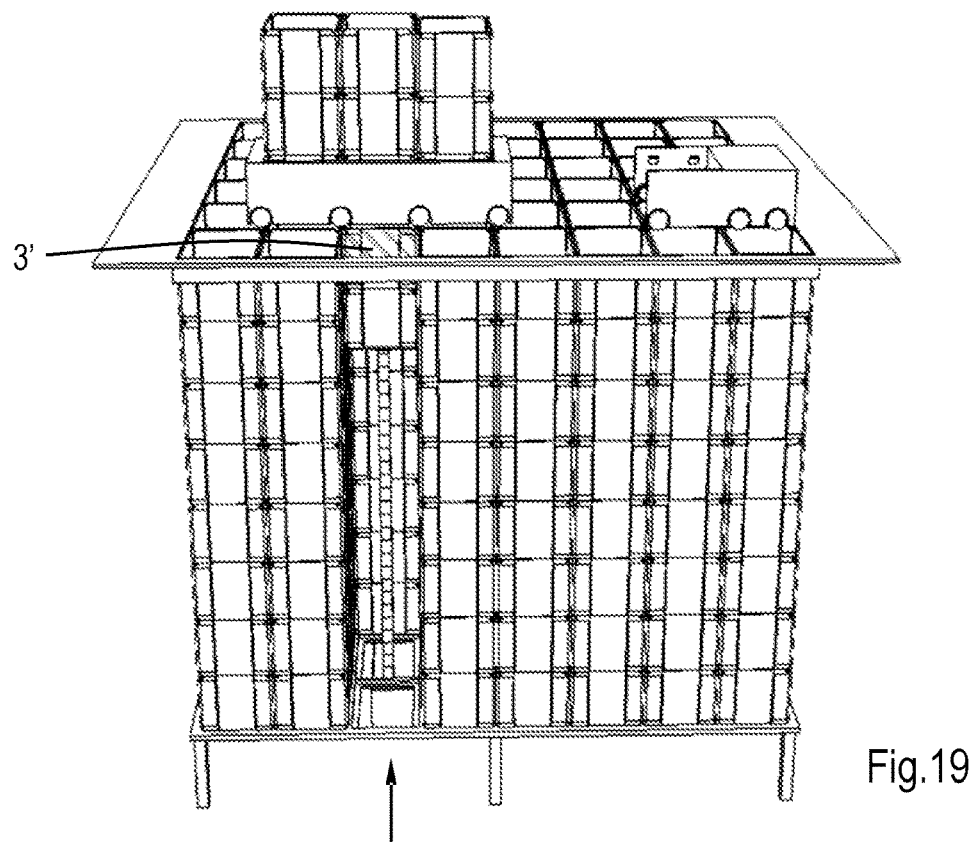

FIG. 17 shows that the auxiliary transport unit 21 has arrived above the target stack 2' which contains the target container 3', whereas an arrow indicates that the stack 2 is lifted by the lifting member 9. FIG. 18 shows that the target container 3' is elevated by four levels and that four upper non-target containers 3 of the target stack 2' are already received by the auxiliary transport unit 21. The auxiliary transport unit 21 is moved to the left after receiving these containers 3 such that a next series of non-target containers 3 can be received by the auxiliary transport unit 21. FIG. 19 shows that the target container 3' forms the top of the stack 2.

Figure 20:
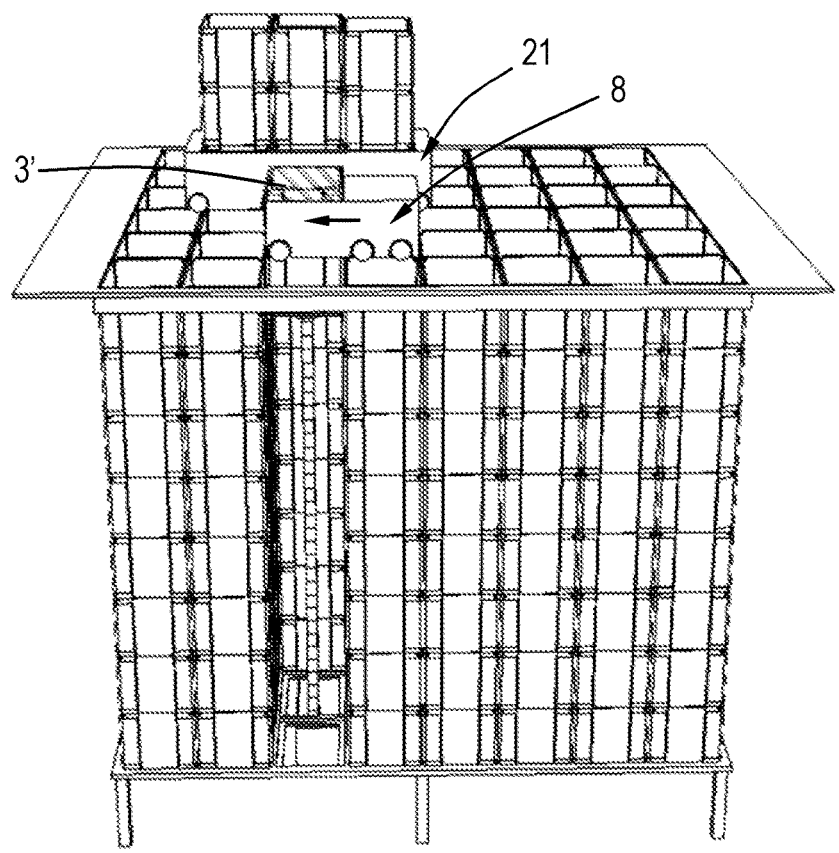
Figure 21:
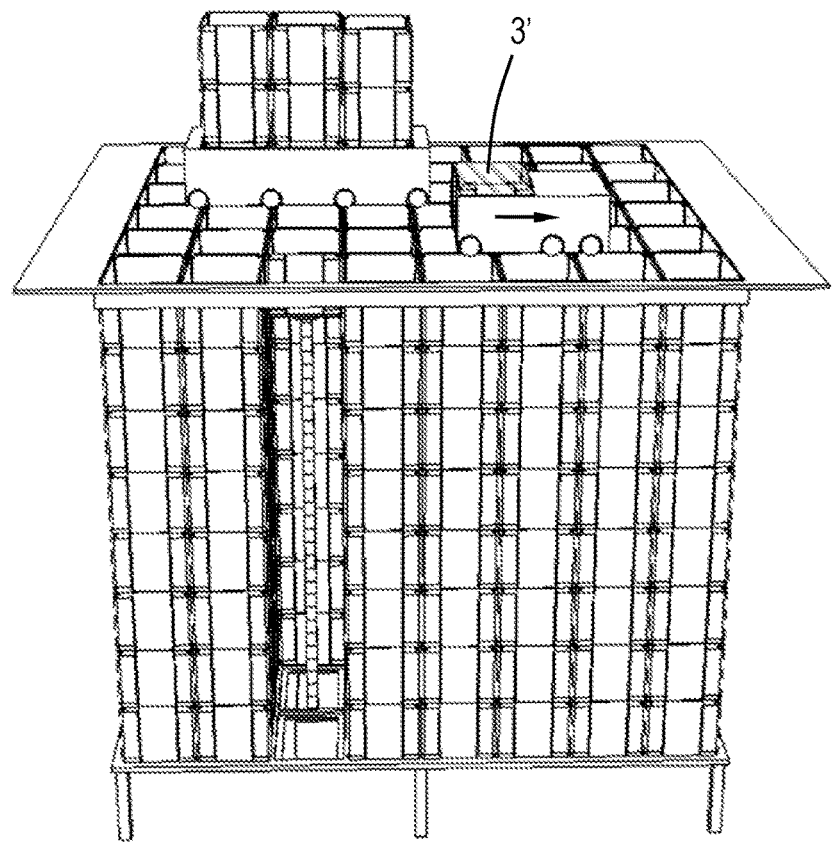

FIG. 20 shows that the auxiliary transport unit 21 is moved in the second direction Y away from the target container 3', whereas the target container 3' is elevated further by the lifting member 9 such that it projects above the adjacent stacks 2, i.e. above the top plane TP. The transport unit 8 is moved to the target container 3'. FIG. 21 shows that the transport unit 1 has engaged the target container 3' and moves towards a location for delivering the target container 3'.

Figure 22:
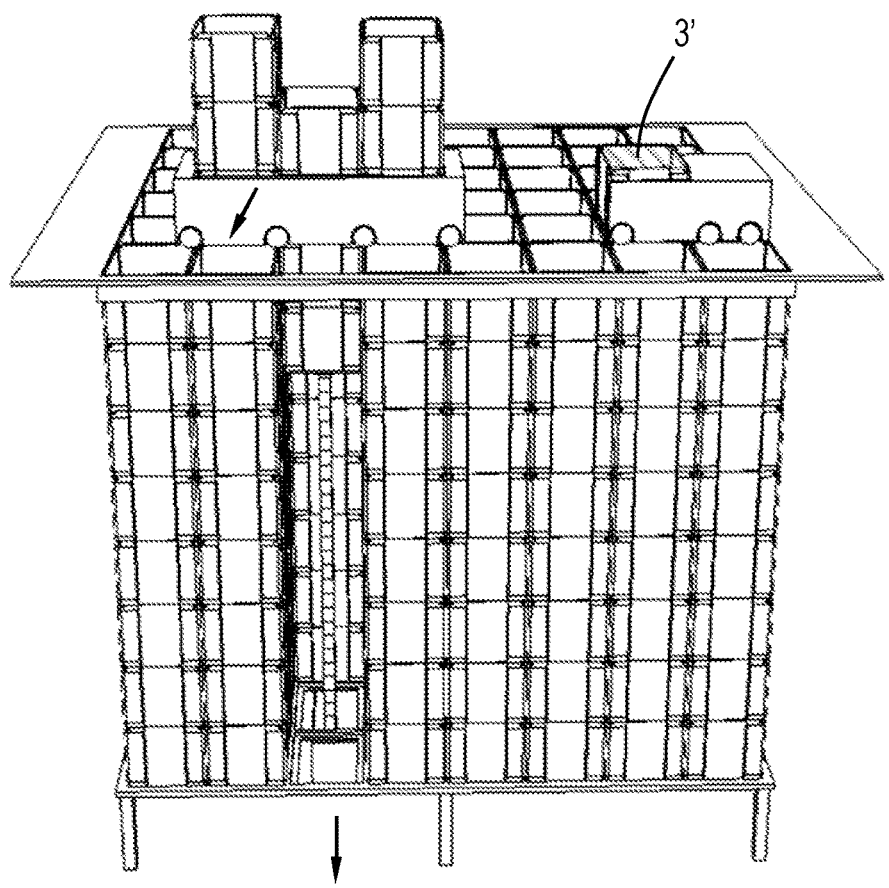
Figure 23:
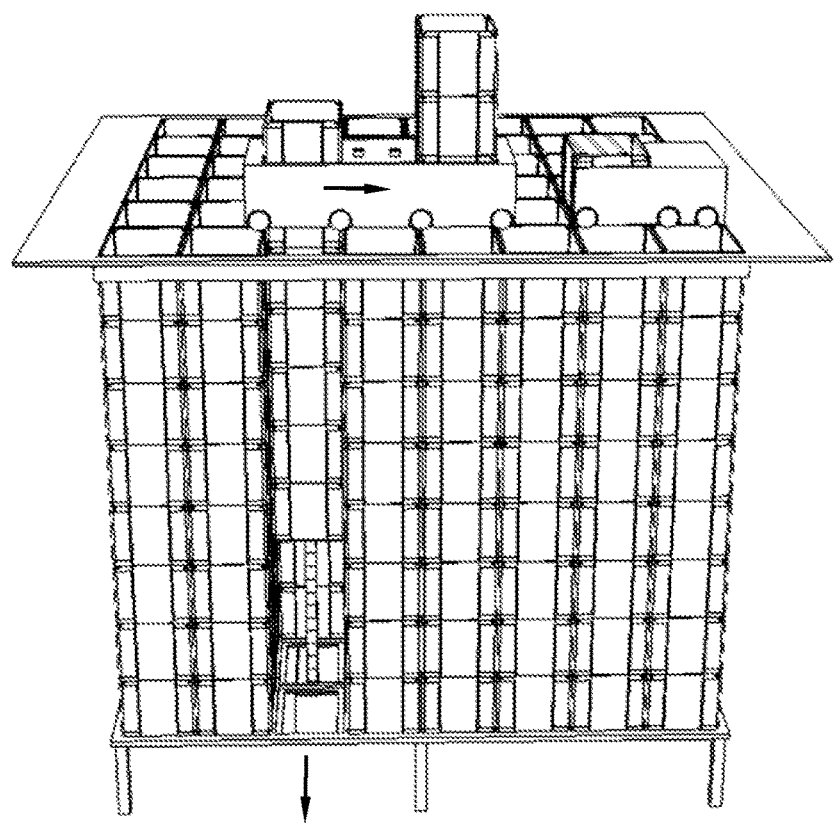
Figure 24:
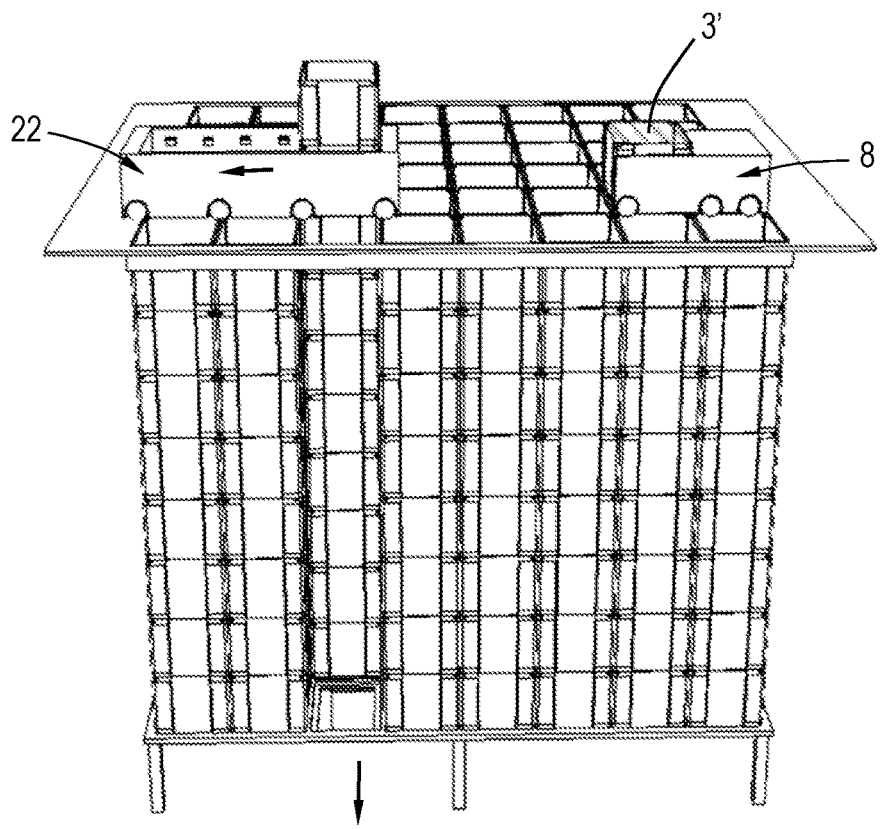
Figure 25:
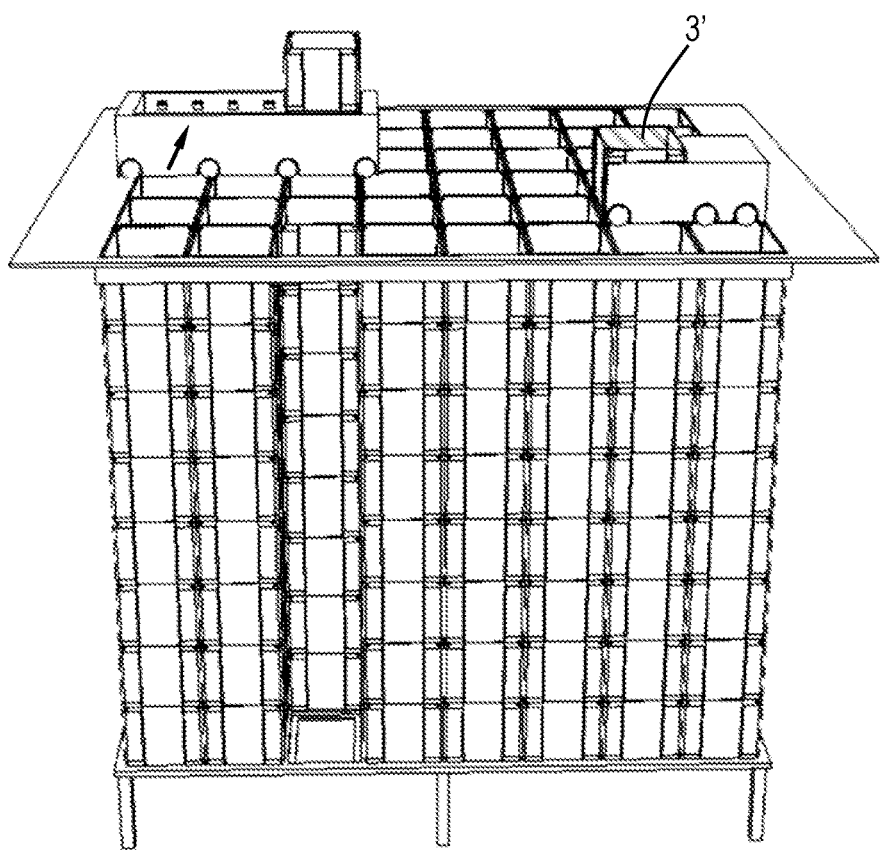

FIGS. 22 and 23 show that the auxiliary transport unit 21 moves back to the location of the target stack 2' from which the target container 3' has been taken and places the containers 3 that originally rested on top of the target container 3' back whereas the lifting member 9 lowers the containers 3. FIGS. 24 and 25 show that when the target stack 2' is entirely constituted again there are two storage containers 3 left at the auxiliary transport unit 21.

If the storage containers 3 are nested such that they cannot be moved in horizontal direction when they are in a stack the engaging members of the transport unit 8 and the auxiliary transport unit 21 may have their own lifting means to lift a container 3 from the top of the stack 2 after it has been elevated above the top plane TP by the lifting member 9. Alternatively, the lifting member 9 may elevate the upper container 3 fully above the adjacent stacks 2 after which the engaging member engages the container and then the lifting member 9 lowers the stack 2 such that the engaged container 3 leaves the nested condition.

FIGS. 16-25 show only one transport unit 8, but it is also possible that the storage system 1 comprises more than one transport unit 8. For example, a second transport unit may be similar as the transport unit 8 but oriented reversely such that the two arms of its container receiving portion are directed opposite to the arms of the container receiving portion 8*b* of the transport unit 8.

Figure 26:
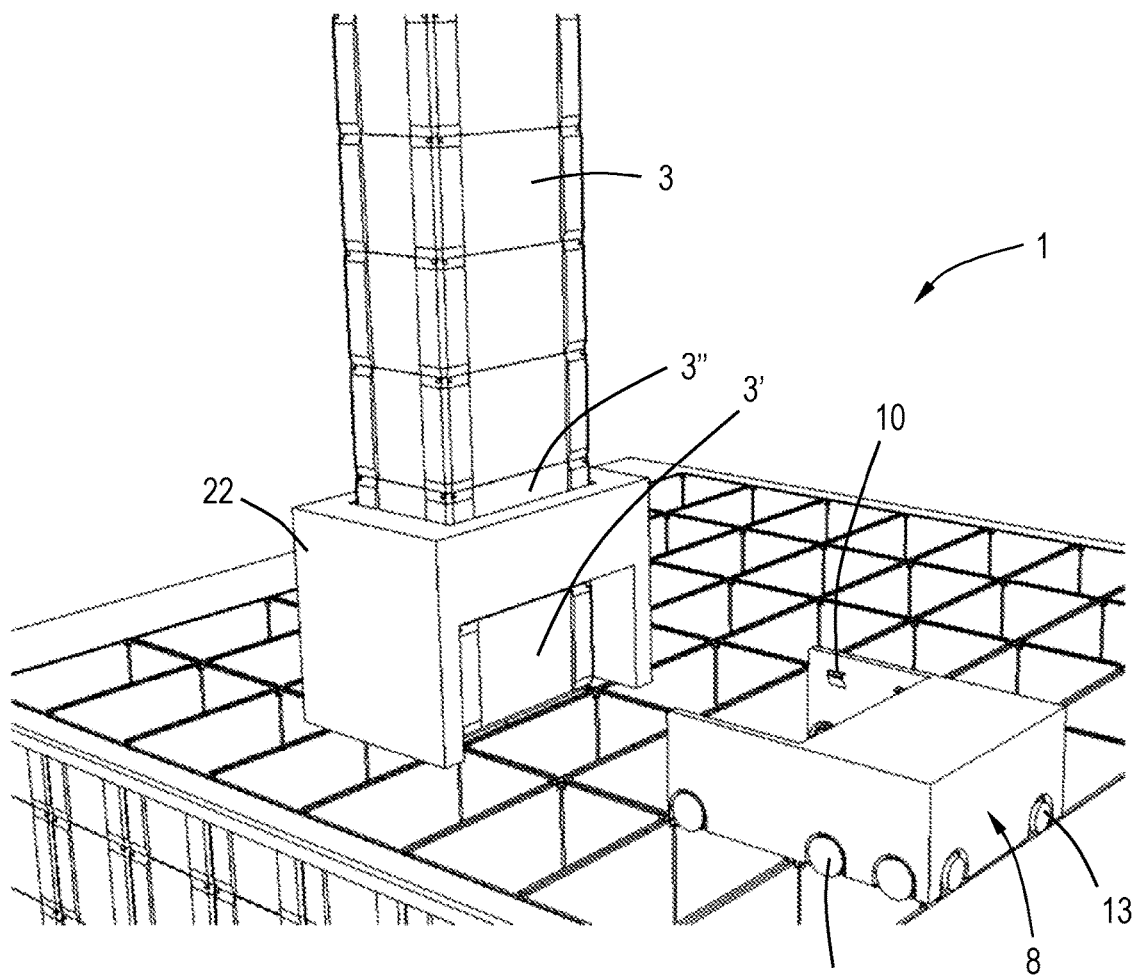
FIG. 26 is a perspective view of an alternative embodiment of the storage system.
Figure 27:
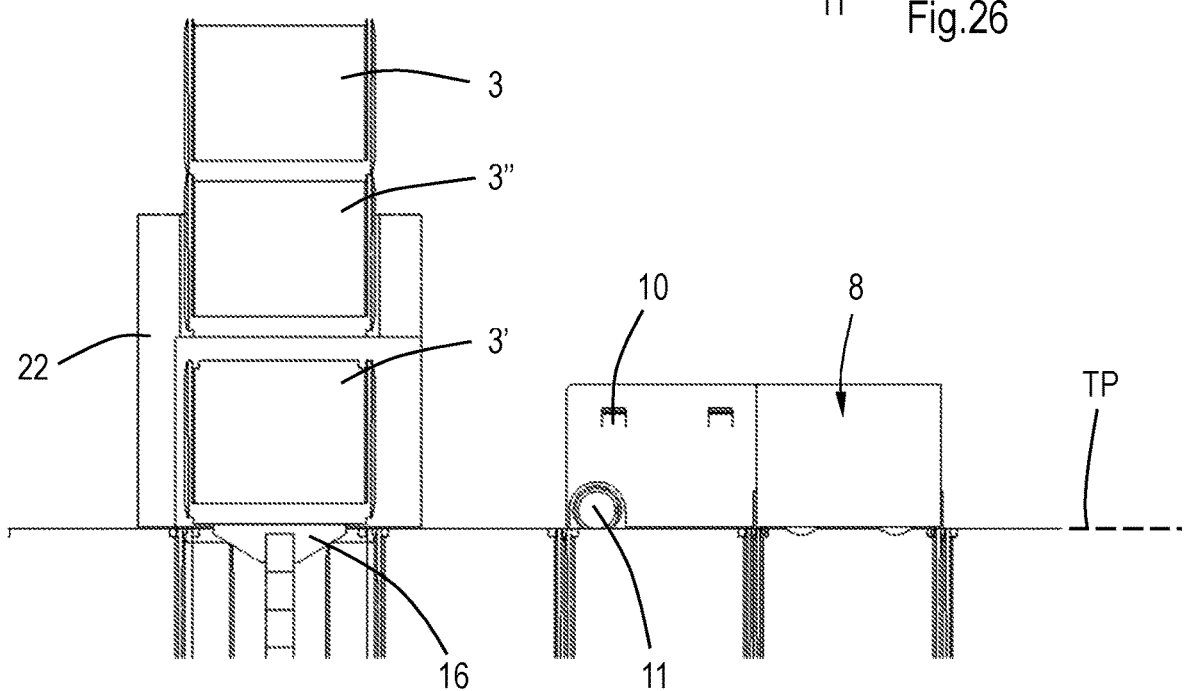
FIG. 27 is a sectional view of the embodiment as shown in FIG. 26.

FIGS. 26 and 27 show an alternative embodiment of the storage system 1, which is provided with a storage vehicle 22 for temporarily storing at least a container 3 at a selected stack 2. The storage vehicle 22 is movable with respect to the stacks 2 in the first and second direction X, Y in a similar way as the transport unit 8. The storage vehicle 22 is provided with engaging means for engaging at least a container 3, for example a gripper (not shown). The storage vehicle 22 is adapted such that when the lifting member 9 lifts the selected stack 2 to a level at which at least two containers 3 project above the top plane TP, the engaging means can engage the second container 3" above the top plane TP whereas the first container, i.e. the target container 3', above the top plane TP is accessible by the transport unit 8. FIG. 27 shows that a stack of containers 3 is lifted by the lifting member 9, whereas the lower container 3" of this stack is engaged by the engaging means of the storage vehicle 22. The target container 3' is separate from the lower container 3" of the stack of containers 3 above it and the transport unit 8 is able to take the target container 3' from the auxiliary transport unit 22. After the target container 3' has been taken away the lifting member 9 can be operated such that the supporting element 16 or any container 3 thereon supports the lower container 3" of the engaged stack at the storage vehicle 22. After disengaging the container 3" the stack of containers 3 can be lowered again. An empty location at the top of the stack 2 due to the missing target container 3' may be filled by a container 3 that was stored on the storage vehicle 22. An advantage of this embodiment is that the storage vehicle 22 can remain at the selected stack 2 during the operation of picking the target container 3'.

In an alternative method the target container 3' can be replaced by another container 3 before taking it away as described above. In this case the transport unit 8 carries a replacement container 3, for example an empty container 3, and moves towards the storage vehicle 22. The actual stack 2 of containers 3 supported by the supporting element 16, which actual stack 2 is only the target container 3' in the condition as shown in FIG. 27, is first lowered in order to create a clear or unoccupied location between the engaged container 3" and the top plane TP. Subsequently, the transport unit 8 can put the replacement container 3 on top of the actual stack 2, i.e on top of the target container 3'. Then, the lifting member 9 can lift the formed stack 2 including the replacement container 3 upon disengaging the engaged container 3" until the engaging means of the storage vehicle 22 engages the replacement container 3. In this condition the target container 3' is located between the engaged replacement container 3" and the top plane TP, i.e. at the location of the first container 3' as shown in FIG. 27. Subsequently, the transport unit 8 can take the target container 3' away, after which the supporting element 16 of the lifting member 9 can be moved upwardly to support the newly formed stack 2 including the replacement container and subsequently lower the whole newly formed stack downwardly. The replacement container is now located at the same location within the stack as the container which is taken away.

It is also possible to clear the location of the first container 3' by lifting the stack 2 such that the target container is engaged by the engaging means of the storage vehicle 22 before the replacement container is put into the cleared location.

If an upper container 3 of a stack 2 is the target container 3, the location for the first container 3' at the storage vehicle 22 as shown in FIGS. 26 and 27 is already empty and ready for receiving a replacement container 3. After the replacement container 3 is put on top of the target container 3 the stack 2 can be lifted until the replacement container 3 is engaged by the engaging means of the storage vehicle 22 and the target container 3 can be taken away by the transport unit 8.

The storage system 1 is also provided with a control unit (not shown) to track and trace the location of all containers 3 and the (auxiliary) transport units 8, 21 and the storage vehicle 22.

The engaging members of the transport unit 8 and the auxiliary transport unit 21 and the engaging means of the storage vehicle 22 may be of the snap-fit type, which engage a container of a lifted stack when the transport unit 8, the auxiliary transport unit 21 or the storage vehicle 22 is positioned at the selected stack, whereas it can be disengaged by controllable actuators, for example after slightly lifting the container by the lifting member 9. The storage vehicle 22 may also be provided with first and second wheels for moving in the first and second direction X, Y like the transport unit 8. All the wheels of the storage vehicle 22 may be lifted at the same time so as to lock the storage vehicle 22 at the target stack.

For example, the engaging member 10 as shown in FIGS. 34-36 may be applied as a snap-fit type. The slider-crank linkages and the containers 3 may be adapted such that when the container receiving portion 8*b* of the transport unit 8 is located above a stack 2 and the lifting member 9 pushes the stack 2 upwardly between the arms 29, projections at opposite sides of the container 3 may contact the cranks 28 and push the sliders 26 upwardly, hence retracting the holders 27. After the projections of the container 3 have passed the slider-crank linkage during further lifting the stack 2 the sliders 26 may fall back such that the holders 27 of the respective arms 29 are moved towards each other. Subsequently, the stack 2 may be lowered such that the projections of the container 3 rest on the holders 27 of the respective arms 29.

The invention is not limited to the embodiments shown in the drawing and described hereinbefore, which may be varied in different manners within the scope of the claims and their technical equivalents.

Figure 30:
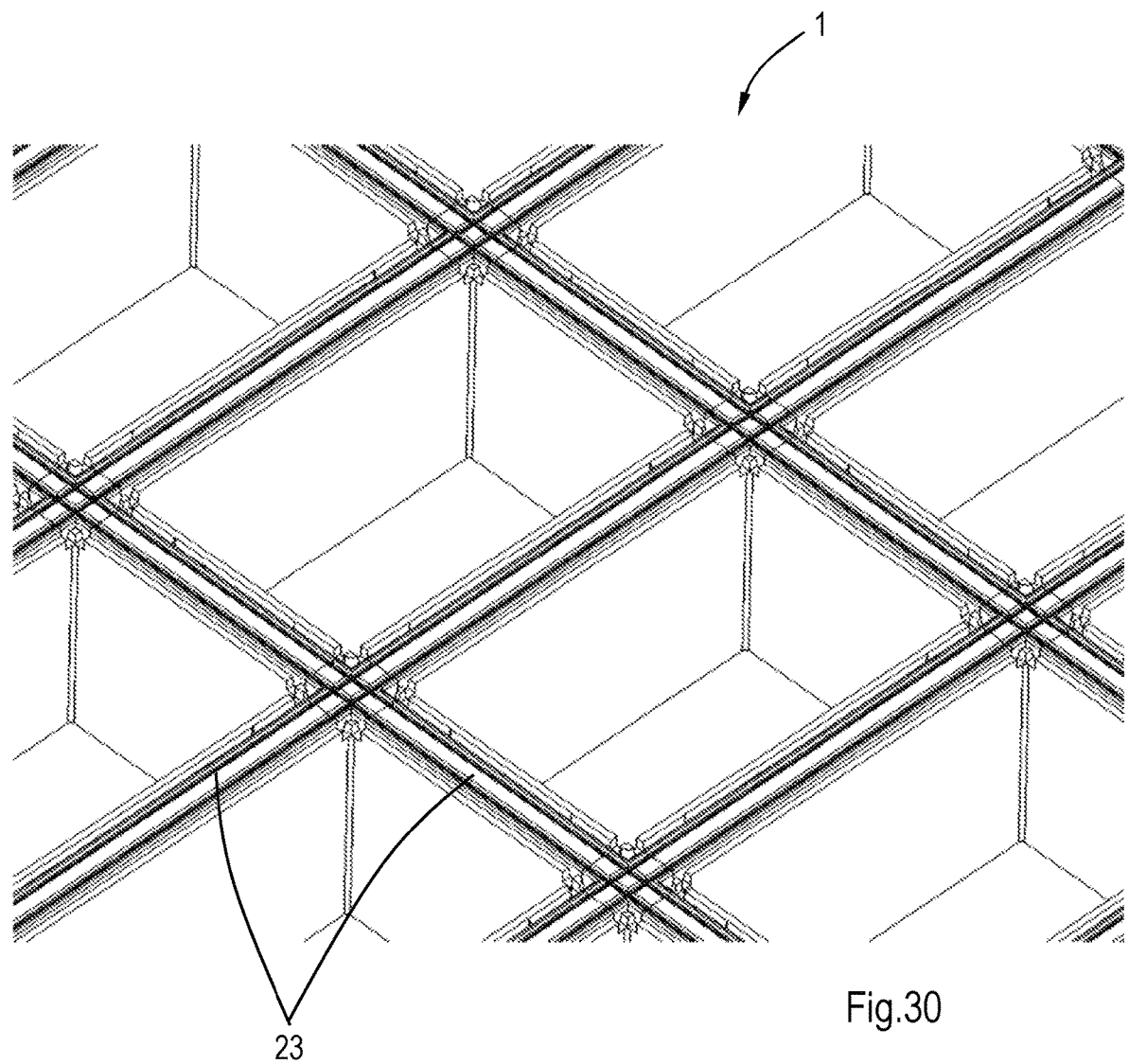
FIG. 30 is a similar view as FIG. 7, but showing an alternative embodiment of the storage system.

The storage system including the lifting member may also be provided with a transport unit which is not directly supported by upper containers of the stacks, but on a separate structure of rails 23, which extend between neighbouring stacks at the top plane TP, see FIG. 30. In this case the stacks 2 are separate from each other and may be guided vertically by a structure which also supports the rails 23.

Figure 40:
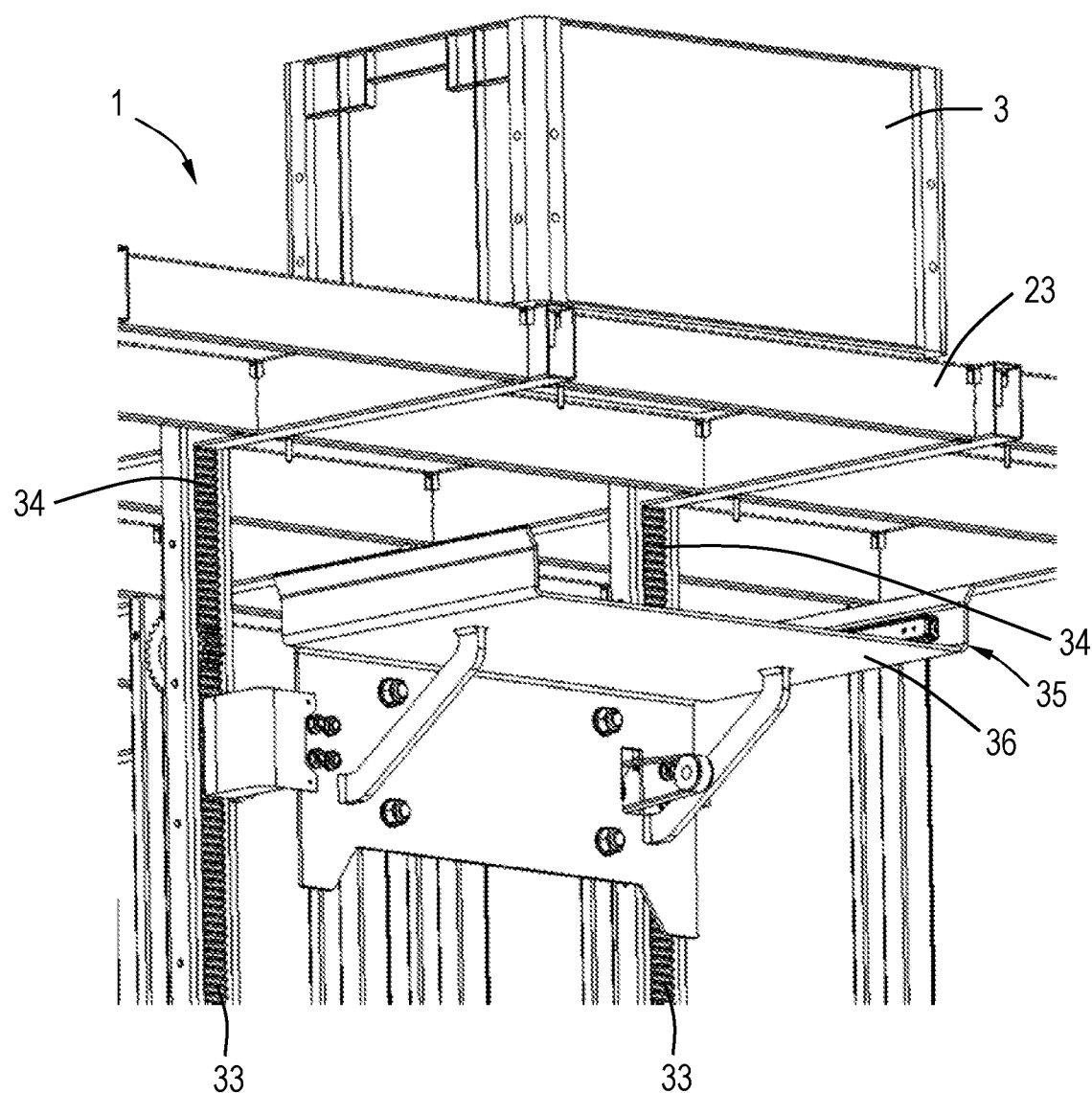
FIG. 40 is a perspective view of an alternative embodiment of the storage system.

FIG. 40 shows an alternative storage system 1. In this case the storage system 1 has two pillars 33 at the circumference of the three-dimensional matrix of storage containers 3. The pillars 33 are provided with respective tooth racks 34 and guides for guiding a climbing vehicle 35 along the pillars 33. The climbing vehicle 35 comprises a tray 36 for receiving a container 3 thereon. Furthermore, the climbing vehicle 35 is provided with drivable pinions which mesh with the respective tooth racks 34 so as to enable the climbing vehicle 35 up and down along the pillars 33.

FIG. 40 shows that the embodiment of the storage system 1 is provided with a structure of rails 23 on which the transport unit 8 runs. A portion of the structure of rails 23 extends beyond the circumference of the three-dimensional matrix of storage containers 3 such that the climbing vehicle 35 moves below the projecting portion. The climbing vehicle 35 can transport a container 3 between the floor and the upper side of the structure of rails 23. The transport unit 8 on top of the structure of rails 23 can transport the container 3 to and from the location where the climbing vehicle 35 arrives at the structure of rails 23. It is conceivable that the climbing vehicle 35 is also provided with means for moving across the floor such that it can transport containers 3 to other locations at horizontal distance from the storage system 1.

The invention is also related to the following aspects:

Aspect 1: A storage system (1), comprising a plurality of vertical stacks (2) of storage containers (3), wherein the stacks (2) are arranged in a horizontal first direction (X) and a horizontal second direction (Y) which is perpendicular to the first direction (X) and wherein the upper sides of the stacks (2) lie in a top plane (TP), a transport unit (8) for transporting at least one container (3) to or from a selected stack (2) in the first and/or second direction (X, Y), a container handling device (9, 10) for transferring at least an upper container (3) from a selected stack (2) to the transport unit (8) before the transport unit (8) including the container (3) is transported from said selected stack (2) and for transferring at least a container (3) from the transport unit (8) to the top of a selected stack (2) after the transport unit (8) including the container (3) is transported to said selected stack (2), wherein the transport unit (8) is directly supported by upper containers (3) of the stacks (2). Since the transport unit is directly supported by upper containers of the stacks a separate frame for supporting the transport unit can be omitted. This provides the opportunity to locate the stacks close to each other or against each other, which provides a maximum storage density.

Aspect 2: A storage system (1) according to aspect 1, wherein each of the containers (3) is provided with a circumferential upper rim (12) and the transport unit (8) comprises wheels (11, 13) which run on the rims (12) of said upper containers (3). This means that the upper rims of the upper containers are used as rails in the first direction and the second direction for supporting the wheels of the transport unit.

Aspect 3: A storage system (1) according to aspect 2, wherein the wheels (11, 13) are flanged and the rims (12) are provided with recesses (14) for allowing the flanges to pass.

Aspect 4: A storage system (1) according to aspect 2 or 3, wherein the transport unit (8) is movable above a row of stacks and its wheels (11, 13) run on upper rims (12) of adjacent containers (3) located at either side of said row. In this case the wheels do not necessarily contact the upper rims of the containers in the row above which the transport unit travels. This means that the transport unit can also travel above the row from which an upper container is missing, for example due to being transported by the transport unit.

Aspect 5: A storage system (1) according to one of the preceding aspects, wherein the stacks (2) rest on a support (4) and wherein the container handling device comprises a lifting member (9) for displacing a selected stack (2) in vertical direction with respect to the support (4), wherein the lifting member (9) is movable below said support (4) in a non-lifting condition thereof, and wherein the container handling device comprises an engaging member (10) that is provided at the transport unit (8) and suitable for engaging at least an upper container (3) of a lifted stack (2) so as to retrieve said container (3) or for releasing an engaged container (3) so as to place said container (3) on top of a selected stack (2).

Aspect 6: A storage system (1) according to aspect 5, wherein the lifting member (9) comprises a drivable push chain (15).

Aspect 7: A storage system (1) according to aspect 6, wherein the push chain (15) is bendable in two directions which are perpendicular to each other.

Aspect 8: A storage system (1) according to aspect 7, wherein the push chain (15) follows a curved path in a horizontally oriented plane when all the stacks (2) rest on the support (4).

Aspect 9: A storage system (1) according to aspect 6 or 7, wherein a portion of the push chain (15) follows a helical path and a vertically oriented portion of the push chain (15) extends within the helical path.

Aspect 10: A storage system (1) according to one of the preceding aspects, wherein the stacks (2) are enveloped by a frame (6) at a distance from the support (4) for keeping the stacks (2) together.

Aspect 11: A storage system (1) according to aspect 10, wherein the frame is provided with actuators for pushing the stacks (2) to each other, for example when the stacks tend to be shifted with respect to each other in horizontal direction.

Aspect 12: A storage system (1) according to one of the aspects 5-9, wherein the storage system (1) is provided with an auxiliary transport unit (21) for transporting a plurality of storage containers (3) to or from a selected stack (2) in the first and/or second direction (X, Y), wherein the auxiliary transport unit (21) is provided with an engaging member for engaging at least an upper container (3) of a lifted stack (2) so as to retrieve said container (3) or for releasing an engaged container (3) so as to place said container (3) on top of a selected stack (2).

Aspect 13: A storage system (1) according to one of the aspects 5-9, wherein the storage system (1) is provided with a storage vehicle (22) for temporarily storing at least a container (3) at a selected stack (2), which storage vehicle (22) is movable with respect to the stacks (2) in the first and/or second direction (X, Y) and provided with engaging means for engaging at least a container (3), wherein the storage vehicle (22) is adapted such that when the lifting member (9) lifts the selected stack (2) to a level at which at least two containers (3) project above the top plane (TP), the engaging means can engage the second container (3") above the top plane (TP) whereas the first container (3') above the top plane (TP) is accessible by the transport unit (8).

Aspect 14: A storage container (3) for use in a storage system (1) according to one of the preceding aspects, wherein the container (3) has an upper rim (12) including a first pair of parallel rim portions (12a) and a second pair of parallel rim portions (12b) which extend perpendicular to the first pair of parallel rim portions (12a), wherein each of the rim portions (12a) of the first pair is provided with recesses (14) at or close to inner sides of the rim portions (12b) of the second pair, which inner sides are directed to each other.

Aspect 15: A push chain (15) for use in a storage system (1) according to one of the aspects 1-13 in combination with one of the aspects 6-9.

The invention claimed is:

1. A storage system comprising:
a plurality of vertical stacks of storage containers, wherein the stacks are arranged in a horizontal first direction and a horizontal second direction which is perpendicular to the first direction,
a transport unit for transporting at least one container to or from a selected stack in the first and/or second horizontal direction,
a container handling device for transferring at least an upper container from a selected stack to the transport unit before the transport unit including the container is transported from said selected stack and for transferring at least a container from the transport unit to the top of a selected stack after the transport unit including the container is transported to said selected stack,
wherein:
the transport unit is movable above the stacks and the transport unit is provided with a first set of wheels at opposite sides of the transport unit for travelling in the first direction and a second set of wheels at opposite sides of the transport unit for travelling in the second direction, wherein at least one of the first and second sets of wheels is liftable with respect to the remainder of the transport unit so as to selectively run either the first set of wheels or the second set of second wheels on top of the stacks or on rails in a grid pattern across the top of the stacks,
the container handling device comprises a lifting member for displacing a selected stack in vertical direction with respect to adjacent stacks,
the lifting member is movable below the stacks in a non-lifting condition thereof, and
the container handling device comprises an engaging member that is provided at the transport unit and suitable for engaging at least an upper container of a lifted stack so as to retrieve said container or for releasing an engaged container so as to place said container on top of a selected stack, and
wherein the stacks rest on a support, the lifting member is suitable for displacing a selected stack in vertical direction with respect to the support, and the lifting member is movable below said support in the non-lifting condition thereof.

2. The storage system according to claim 1, wherein the lifting member comprises a drivable push chain.

3. The storage system according to claim 2, wherein the push chain is bendable in two directions which are perpendicular to each other.

4. The storage system according to claim 3, wherein the push chain follows a curved path in a horizontally oriented plane when all the stacks rest on the support.

5. The storage system according to claim 3, wherein a portion of the push chain follows a helical path, and a vertically oriented portion of the push chain extends within the helical path.

6. The storage system according to claim 2, wherein the drivable push chain is mounted on a carriage and rotatable with respect to the carriage about a vertical axis of rotation, and the push chain is guided such that it follows a horizontal and a vertical path during lifting a stack, which vertical path is located at a distance from the axis of rotation.

7. The storage system according to claim 6, wherein the carriage is guidable along a guide which is located below the stacks.

8. The storage system according to claim 6, wherein the guide is linear.

9. The storage system according to claim 8, wherein the transport unit has a container receiving portion including two arms for receiving a container between the arms, and the engaging member comprises at least two holders which are movably mounted to the respective arms and movable towards each other so as to engage a container between the arms.

10. The storage system according to claim 9, wherein the holder is part of a slider-crank linkage of which a connecting rod is formed by the holder and of which a slider is mounted to a corresponding arm and movable with respect to the corresponding arm in vertical direction, a first portion of the holder is rotatably mounted to the slider and a second portion of the holder remote from the first portion of the holder is rotatably mounted to a first portion of a crank of the slider-crank linkage, a second portion of the crank remote from its first portion is rotatably mounted to the corresponding arm, and wherein the storage system is provided with an auxiliary transport unit for transporting a plurality of storage containers to or from a selected stack in the first and/or second direction, wherein the auxiliary transport unit is provided with an engaging member for engaging at least an upper container of a lifted stack so as to retrieve said upper container or for releasing an engaged container so as to place said container on top of a selected stack.

11. The storage system according to claim 10, wherein the storage system is provided with a storage vehicle for temporarily storing at least a container at a selected stack, which storage vehicle is movable with respect to the stacks in the first and/or second direction and provided with engaging means for engaging at least a container, the storage vehicle is adapted such that when the lifting member lifts the selected stack to a level at which at least two containers project above a top plane in which upper sides of the stacks lie, the engaging means can engage the second container above the top plane, whereby the first container above the top plane is accessible by the transport unit, the transport unit is provided with a first set of wheels at opposite sides of the transport unit for travelling in the first direction and a second set of wheels at opposite sides of the transport unit for travelling in the second direction, wherein at least one of the first and second sets of wheels is liftable with respect to the remainder of the transport unit so as to selectively run either the first set of wheels or the second set of wheels on top of the stacks or on rails in a grid pattern across the top of the stacks, and respective shafts of the wheels of at least one of the first and second sets of wheels are eccentrically and movably mounted to the remainder of the transport unit.

12. The storage system according to claim 1, wherein the transport unit has a container receiving portion including two arms for receiving a container between the arms, and the engaging member comprises at least two holders which are movably mounted to the respective arms and movable towards each other so as to engage a container between the arms.

13. The storage system according to claim 12, wherein the holder is part of a slider-crank linkage of which a connecting rod is formed by the holder and of which a slider is mounted to a corresponding arm and movable with respect to the corresponding arm in vertical direction, a first portion of the holder is rotatably mounted to the slider and a second portion of the holder remote from the first portion of the holder is rotatably mounted to a first portion of a crank of the slider-crank linkage, and a second portion of the crank remote from its first portion is rotatably mounted to the corresponding arm.

14. The storage system according to claim 1, wherein the storage system is provided with an auxiliary transport unit for transporting a plurality of storage containers to or from a selected stack in the first and/or second direction, wherein the auxiliary transport unit is provided with an engaging member for engaging at least an upper container of a lifted stack so as to retrieve said upper container or for releasing an engaged container so as to place said container on top of a selected stack.

15. The storage system according to claim 1, wherein the storage system is provided with a storage vehicle for temporarily storing at least a container at a selected stack, which storage vehicle is movable with respect to the stacks in the first and/or second direction and provided with engaging means for engaging at least a container, and the storage vehicle is adapted such that when the lifting member lifts the selected stack to a level at which at least two containers project above a top plane in which upper sides of the stacks lie, the engaging means can engage the second container above the top plane, whereby the first container above the top plane is accessible by the transport unit.

16. A method of operating the storage system of claim 15, wherein the location for the first container is clear or made clear by lifting the selected stack through the lifting member until the engaging means of the storage vehicle engages a predetermined container and comprising steps of:
subsequently lowering the lifting member so as to clear the location between the engaged container and the top plane, and the transport unit puts a replacement container at the clear location, after which the lifting member lifts or lowers the formed stack including the replacement container upon disengaging the engaged container in case of an engaged container until a target container from the stack forms the first container above the top plane so as to enable the transport unit to take away the target container.

17. The method according to claim 16, wherein the predetermined container is adjacent to the target container.

18. The storage system according to claim 1, wherein respective shafts of the wheels of the at least one of the first and second sets of wheels are eccentrically and movably mounted to the remainder of the transport unit.

19. The storage system according to claim 1, wherein the storage system is provided with a climbing vehicle which is drivable along a vertical guide at a circumference of the stacks for transporting a container in vertical direction to and from the top of an adjacent stack.

* * * * *

UNITED STATES PATENT AND TRADEMARK OFFICE
CERTIFICATE OF CORRECTION

PATENT NO. : 12,371,258 B2
APPLICATION NO. : 18/589394
DATED : July 29, 2025
INVENTOR(S) : Oscar Van Buijtene Page 1 of 1

It is certified that error appears in the above-identified patent and that said Letters Patent is hereby corrected as shown below:

On the Title Page

Item (63) under Related U.S. Application Data, please replace:
"Continuation of application No. 17/258,985, filed as application No. PCT/EP2018/068845, on Jul. 11, 2018, now Pat. No. 11,981,506."
With:
--Continuation of application No. 17/258,985, filed as application No. PCT/EP2019/068761 on Jul. 11, 2019, now Pat. No. 11,981,506.--.

Item (30), please insert:
--Foreign Application Priority Data
Jul. 11, 2018 (EP) .........PCT/EP2018/068845--.

Signed and Sealed this
Fourteenth Day of October, 2025

John A. Squires
*Director of the United States Patent and Trademark Office*